United States Patent [19]

Erdman

[11] Patent Number: 5,225,712
[45] Date of Patent: Jul. 6, 1993

[54] VARIABLE SPEED WIND TURBINE WITH REDUCED POWER FLUCTUATION AND A STATIC VAR MODE OF OPERATION

[75] Inventor: William L. Erdman, Brentwood, Calif.

[73] Assignee: U.S. Windpower, Inc., Livermore, Calif.

[21] Appl. No.: 799,416

[22] Filed: Nov. 27, 1991

Related U.S. Application Data

[63] Continuation-in-part of Ser. No. 649,567, Feb. 1, 1991, Pat. No. 5,083,039.

[51] Int. Cl.$^5$ .............................. H02P 9/00; F03D 7/00
[52] U.S. Cl. ........................................ 290/44; 290/55; 290/1
[58] Field of Search ................................. 290/44, 55

[56] References Cited

U.S. PATENT DOCUMENTS 4,251,735  2/1981  Coleman .................................. 307/46
4,251,736  2/1981  Coleman .................................. 307/46

*Primary Examiner*—A. D. Pellinen
*Assistant Examiner*—Robert L. Hoover
*Attorney, Agent, or Firm*—Blakely, Sokoloff, Taylor & Zafman

[57] ABSTRACT

A wind turbine power converter is disclosed herein that smooths the output power from a variable speed wind turbine, to reduce or eliminate substantial power fluctuations on the output line. The power converter has an AC-to-DC converter connected to a variable speed generator that converts wind energy to electric energy, a DC-to-AC inverter connected to a utility grid, and DC voltage link connected to an electrical energy storage device such as a battery or a fuel cell, or a photovoltaic or solar cell. Also, an apparatus and method is disclosed herein for controlling the instantaneous current flowing through the active switches at the line side inverter to supply reactive power to the utility grid. The inverter can control reactive power output as a power factor angle, or directly as a number of VARs independent of the real power. Reactive power can be controlled in an operating mode when the wind turbine is generating power, or in a static VAR mode when the wind turbine is not operating to produce real power. To control the reactive power, a voltage waveform is used as a reference to form a current control waveform for each output phase. The current control waveform for each phase is applied to a current regulator which regulates the drive circuit that controls the currents for each phase of the inverter. Means for controlling the charge/discharge ratio and the regulating the voltage on the DC voltage link is also disclosed.

59 Claims, 21 Drawing Sheets
Microfiche Appendix Included
(2 Microfiche, 119 Pages)

FIELD ORIENTATION
CONVERTER 94

DELTA MODULATOR CURRENT CONTROLLER

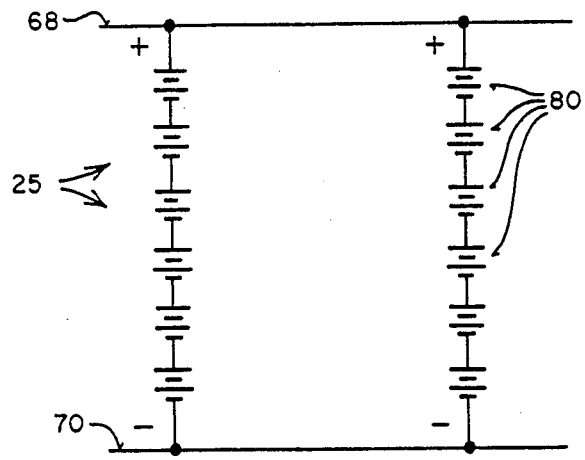
FIG_16
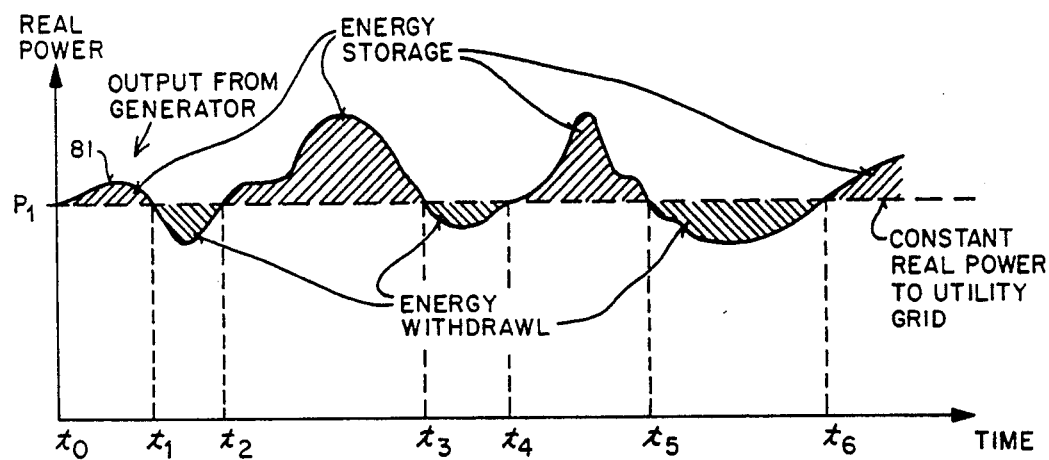
FIG_17
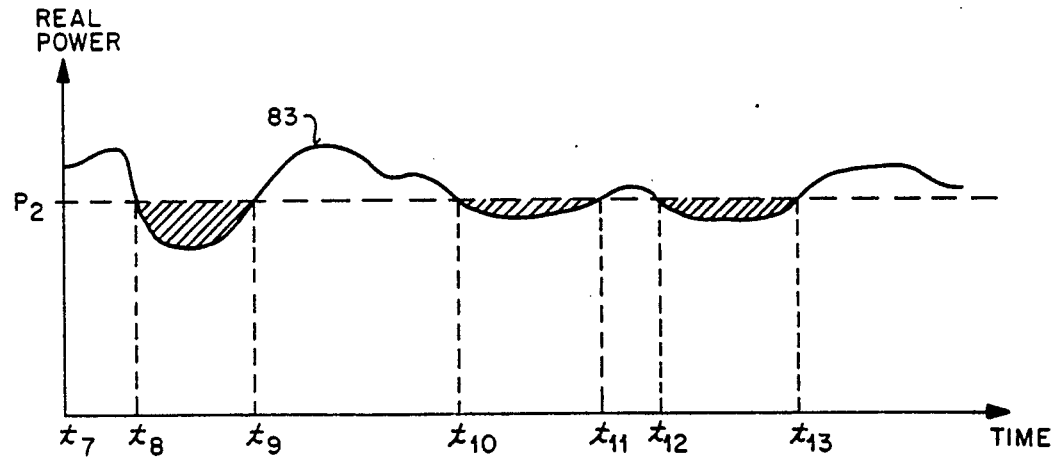
FIG_18

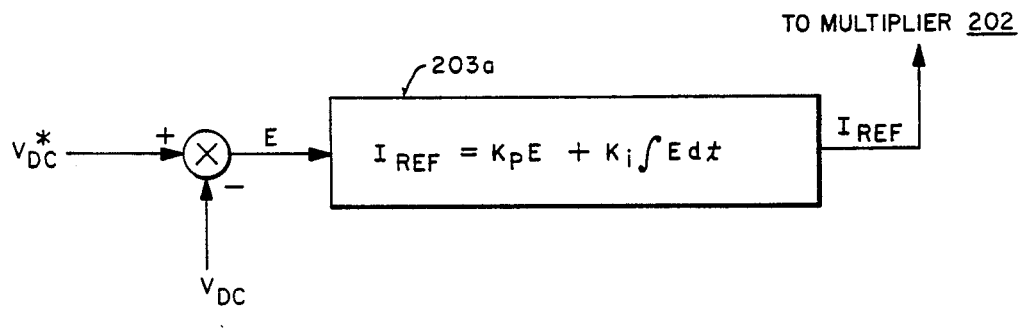
FIG_19
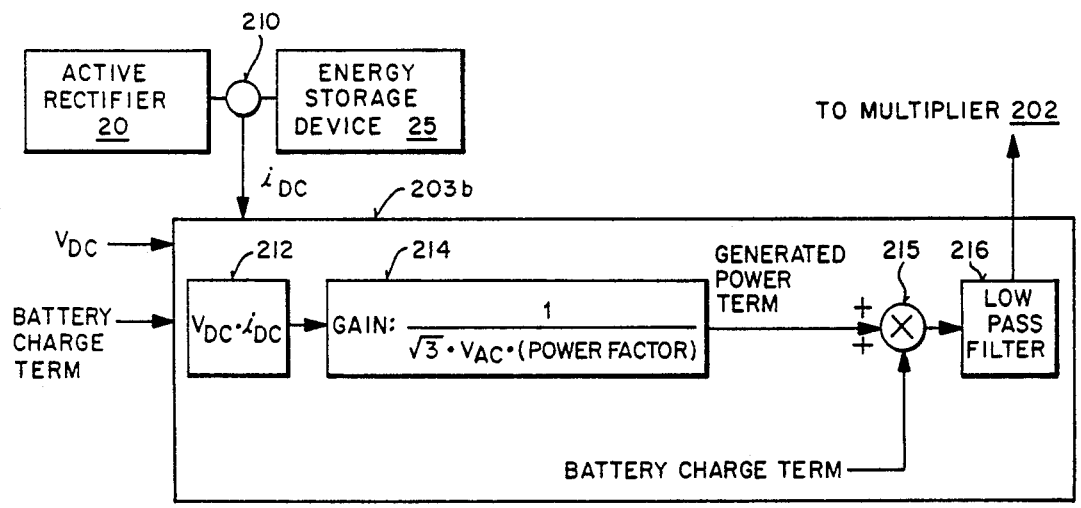
FIG_20
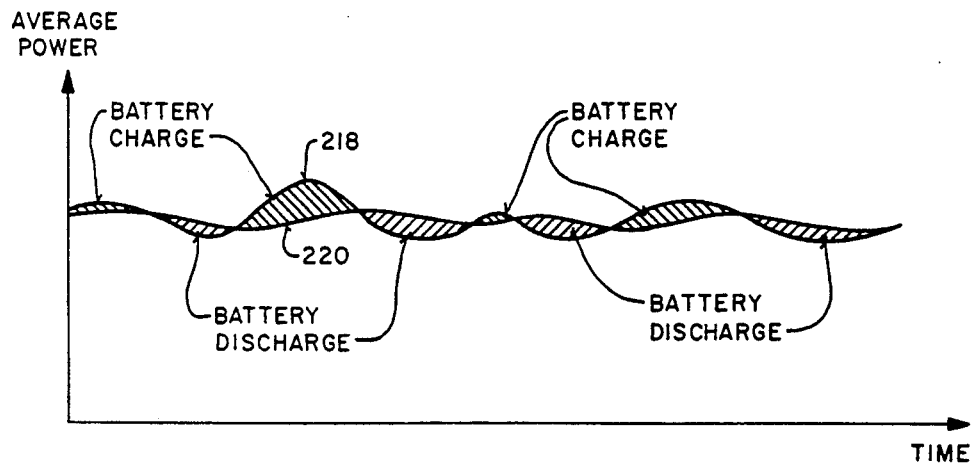
FIG_21

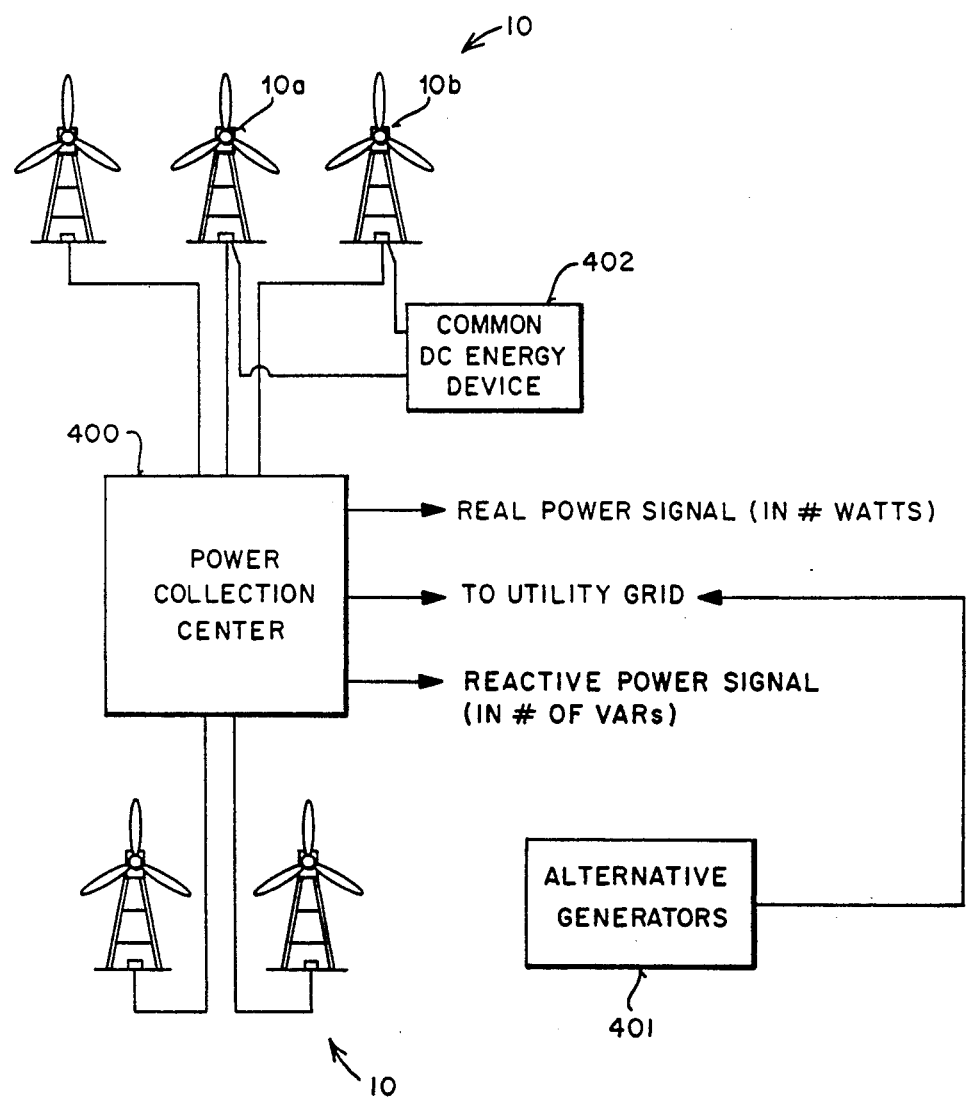
FIG_25

VARIABLE SPEED WIND TURBINE WITH REDUCED POWER FLUCTUATION AND A STATIC VAR MODE OF OPERATION

This is a continuation-in-part of a co-pending patent application, Ser. No. 07/649,567, filed on Feb. 1, 1991 now U.S. Pat. No. 5,083,039, issued Jan. 21, 1992.

REFERENCE TO MICROFICHE APPENDIX

Reference is hereby made to a microfiche appendix submitted herewith, consisting of two microfiche of 119 frames.

CROSS-REFERENCE TO RELATED APPLICATIONS

Cross-reference is hereby made to related commonly assigned, co-pending patent applications, including Ser. No. 07/728,112, filed on Jul. 10, 1991 entitled "Low-Noise Power Bus", Ser. No. 07/660,050 filed on Feb. 22, 1991, entitled "Four Quadrant Motor Controller, and Ser. No. 07/800,643, filed of even date herewith, entitled "Static Reactive Power Compensator".

BACKGROUND OF THE INVENTION

1. Field of the Invention

This invention relates generally to wind turbines that operate at variable speed under varying wind speeds, and relates more particularly to a power converter for converting varying wind energy into substantially smooth AC electrical power having a controlled reactive power.

2. Description of the Relevant Art

Wind turbines provide a primary source of energy that can be converted into electricity and supplied to utility power grids. Conversion of wind energy to electrical energy is accomplished in a wind turbine by driving an electrical generator, which is commonly an AC induction generator. If the electrical power generated by a wind turbine is to be supplied to a utility power grid, then it must have a constant frequency. Conventionally, constant frequency operation is accomplished by driving the generator at a constant rotational speed which requires that the wind turbine rotate at a constant speed unless a variable speed transmission is used. Unfortunately, constant speed operation of a wind turbine limits energy conversion efficiency due to the variable wind speeds powering the wind turbine. For optimal energy recovery, turbine rotor speed is controlled as a function of pitch angle and wind speed.

Variable speed wind turbines have been proposed for increasing the energy conversion efficiencies of constant speed wind turbines. By varying the rotor speed with the varying wind speed, improved energy recovery can be achieved over a range of wind speeds. Also, mechanical stresses caused by wind gusts can be reduced by limiting the torque acting on the wind turbine by the generator and allowing the wind turbine to speed up in response to wind gusts.

Although variable speed wind turbines are advantageous from the perspective of increased energy conversion and reduced stresses, the electrical generation system is more complicated than that of a constant speed wind turbine. Since a generator is usually coupled to a variable speed rotor through a fixed-ratio gear transmission, the electrical power produced by the generator will have a variable frequency. This variable frequency AC must be converted to a constant frequency AC before it can be used by the utility power grid. The conversion can be accomplished either directly by a frequency converter or through an intermediate conversion to DC by a rectifier and subsequent inversion to fixed-frequency AC by means of an inverter.

For a utility using power generated by wind turbines, a substantial disadvantage is the power output fluctuation caused by wind speed variations. Wind-caused power fluctuations will occur using any wind turbine, whether it be variable speed or constant speed. Problems resulting from power fluctuation are particularly acute if wind turbines supply a large portion of the energy needs of the grid, such as 10% or even 25% which is common in remote installations. Power fluctuations require the utility to make up a deficit from other sources such as oil-fired generators. When a power deficit occurs, these generators may be loaded sufficiently beyond their capacity that they slow down. When they slow down, the frequency of the output changes, for example, to 55 or even 50 Hz from the standard 60 Hz frequency. Such low frequencies can adversely affect appliances such as clocks and other electrical equipment. It would be an advantage to provide a wind turbine with an approximately constant of power output regardless of the inevitable wind speed fluctuations. If power output fluctuations from wind turbines could be minimized or even avoided completely, then utility grids would not be required to supply the deficit power from their generators and a constant 60 Hz frequency could be maintained, therefore avoiding adverse effects on electrical equipment. It would be an advantage to provide a wind turbine that supplies a constant amount of power regardless of wind speed variations.

Utility companies prefer to supply their customers with power at a unity power factor, meaning that the current and voltage are exactly in phase. However, their customers' loads are often such that current tends to be pulled out of phase with the voltage. For example, a customer who has many motors operating in his facility will cause the current to lag the voltage at an angle between zero and 90°. A load that tends to cause the current to become out of phase with the voltage is termed a "reactive load". Such reactive loads are common and are measured in Volt-Ampere Reactive units, or "VARs". In order to address the problem of reactive loads, utilities have relied upon banks of capacitors to help pull the current back in phase. However, capacitor banks have drawbacks including limits on the number of VARs that can be supplied to counteract inductive loads and a limited ability to select the amount of VARs to be supplied to the utility.

Conventional constant speed wind turbines provide output power with a lagging current. In order to provide a power factor of unity to the utility during operation, constant speed wind turbine plants have employed large capacitor banks to pull the current in phase with the voltage. The capacitor banks have all the disadvantages outlined above, including lack of ability to select the number of VARs necessary to precisely compensate for the VARs provided by the wind turbines. As an additional disadvantage, capacitor banks produce unpredictable switching transients when switching the capacitor banks on- or off- line.

When the wind is not blowing, a wind turbine cannot produce real power because the rotor is not turning. During periods of no wind, conventional wind turbines sit idle, doing nothing. It would be an advantage to provide a wind turbine that has a static VAR compensator with an ability to provide reactive power in the form of VARs to the utility whether or not the wind turbine is operating. It would be a further advantage if the number of VARs were selectable independent of the amount of real power flowing through the static VAR compensator. It would be an even further advantage if the static VAR compensator were an element of the wind turbine, and therefore VAR compensation would require no additional hardware such as expensive capacitor banks and switching devices.

SUMMARY OF THE INVENTION

The present invention provides a wind turbine power converter that smooths the output power from a variable speed wind turbine, to reduce or eliminate substantial power fluctuations on the output line. Also, the present invention provides a wind turbine power converter that outputs a constant number of VARs independent of the real power; i.e., it can output a constant number of VARs whether or not the wind turbine is operating to produce real power. When the wind turbine is not operating, the power converter operates to produce VARs in what is termed a "static VAR" mode.

The preferred embodiment of the present invention comprises a wind turbine connected to a power converter. The power converter has a DC voltage link that is connected to an electrical energy storage device. The DC voltage link may be connected to any of a number of conventional electrical energy storage devices: a conventional battery such as a lead-acid battery, an electrochemical device such as a fuel cell, superconducting magnets, or a simple capacitor bank. Alternatively, photovoltaics or solar cells may be used to provide electrical energy during deficits in energy production, for example.

The use of energy storage in the wind turbine has at least two advantages. One advantage is a reduced output power fluctuation to the grid, so that power fluctuations are reduced or even eliminated completely. A second advantage is availability of energy to operate the wind turbine in the absence of utility power, for example during controlled shutdown.

In accordance with one preferred embodiment, the power converter can be operated as a VAR compensator that provides a selectable number of VARs to the utility. In the preferred embodiment, the number of VARs can be selected independently of the amount of watts (real power) flowing through the power converter. In other embodiments, the ratio between the real power and the reactive power can be controlled; i.e., the power factor angle can be controlled.

To provide a desired reactive power level, the instantaneous current flowing through the active switches at the line side inverter can be controlled to supply output electricity with a desired relationship between voltage and current. Disclosed herein are at least two embodiments of the inverter control unit: a first inverter control unit that can control only the power factor angle, and a second inverter control unit that can control either the number of VARs or the power factor angle. Both inverter control units use a voltage waveform as a reference waveform for further operations. Specifically, the reference waveform is obtained with conventional voltage transformers connected to each phase of the utility grid on the output side of the inverter.

To form a template waveform indicative of a desired power factor angle, the first inverter controller unit obtains a reference waveform, rotates the reference waveform by a selected power factor angle to yield a template waveform, and multiplies the template waveform by a multiplication factor $I_{ref}$ to form a current control waveform that defines desired output currents. The current control waveform for each phase is applied to a current regulator which regulates the drive circuit that controls the currents for each phase of the inverter. Thus, the current control waveform controls the active switches to produce output currents that correspond to the desired output currents.

The multiplication factor, $I_{ref}$, can be calculated in various ways. Described herein are two methods of calculating the multiplication factor $I_{ref}$. The first method, the proportional+integral method, is implemented in a proportional/integral (P/I) multiplier selector. The P/I multiplier selector is particularly appropriate to maintain a constant voltage on the DC voltage link when the amount of energy storage is small. The P/I multiplier selector applies a voltage error (the measured voltage on the DC voltage link less the desired voltage for the DC voltage link) to a conventional proportional/integral formula.

The multiplier selector may be unnecessary if a large energy source, such as a fuel cell, is used as an energy storage device. Such a fuel cell inherently regulates the voltage on the DC voltage link. In that instance, the multiplier $I_{ref}$ may be selected directly by an operator, or by a control system to output a desired real power amount.

If the energy storage device includes a battery or another substantial energy storage device that stores energy as well as sources energy, the second multiplier selector, a charge/discharge multiplier selector that produces a selected charge/discharge ratio in the energy storage device, is more appropriate. For the charge/discharge multiplier selector, a current sensor positioned between the active rectifier and the energy storage device measures the generator-side current supplied from the generator-side to the energy storage device. This sensed current is multiplied by the voltage across the DC voltage link. The voltage-current product is then multiplied by a factor inversely proportional to the product of the power factor and the RMS voltage on the utility grid. This result is then added to a battery charge term which indicates the extent to which the battery needs to be charged or discharged. The form of the battery charge term is highly dependent upon a particular battery or energy storage device. The sum of the product and the battery charged term is applied to a low pass filter, with a low cut-off frequency of, for example 10 Hz or less. The output of the low pass filter is applied as the multiplier value, $I_{ref}$. The effect of the low pass filter is to smooth out typical fluctuations that occur with wind variations during normal operation of a variable speed wind turbine.

As mentioned above, the type of multiplier selector that is appropriate for a particular application is dependent upon the energy storage device. The type of multiplier selector is not dependent upon the inverter control unit and thus either of the multiplier selectors may be used with the first inverter control unit described above as well as the second control unit to be described below. The second inverter control unit also uses the reference waveform to create, for each phase, two waveforms; a real waveform and an imaginary waveform. The real waveform includes the reference waveform substantially unchanged, and the imaginary waveform includes the reference waveform rotated by 90°. The imaginary waveform is multiplied by a VAR multiplier $M_1$ that is selected with a VAR control signal to supply the desired number of VARs. The real waveform is multiplied by a real multiplier $M_2$. Preferably, the real multiplier $M_2$ is selected as described above to select the multiplier $I_{ref}$.

As an alternative to supplying a selected number of VARs, the second inverter control unit can also provide an approximately constant power factor angle. To supply an approximately constant power factor angle, an additional constant, defined as K, is multiplied by $I_{ref}$, the output of the multiplier selector, and this product is then applied as the VAR multiplier $M_1$ in lieu of the previously described multiplier $M_1$. The value for K is supplied by an operator, thus allowing the operator to control the power factor angle.

The multiplied imaginary waveform and the multiplied real waveform are then added to provide a current control waveform for each phase. As with the first inverter control unit, the current control waveform is applied to a current regulator in a drive circuit that drives the switches of the inverter circuit to provide the instantaneous currents specified by the current control waveform. Thus, reactive power can be specified and controlled by directly controlling the currents through each of the phase lines.

One illustrated embodiment includes a variable speed wind turbine comprising a turbine rotor that drives a multiphase generator, a power converter with active switches that control stator electrical quantities in each phase of the generator, and a generator controller operating under field orientation control and responsive to a torque reference signal for defining a desired quandrature axis current and for controlling the active switches to produce stator electrical quantities that correspond to the desired quadrature axis current.

Described herein is a method for controlling torque reacted by a multiphase generator of a wind turbine, where a power converter with active switches controls electrical quantities in the stator of the generator to establish a rotating flux field in the stator and rotor of the generator. The method includes the steps of defining a torque reference signal indicative of a desired generator torque, converting the torque reference signal into a desired quadrature axis current representing torque in rotating field coordinates normal to the rotor flux field, and controlling the active switches of the power converter to produce stator electrical quantities that correspond to the desired quadrature axis current.

The field oriented control defines the desired generator operation in terms of a rotating frame of reference to decouple stator flux-producing currents from stator torque-producing currents. The desired generator operation is defined by a desired direct axis (flux-producing) current in rotating field coordinates aligned with the direction of the rotor flux field and a desired quadrature axis (torque-producing) current in field coordinates oriented normal to the rotor flux field. Generator torque is controlled by controlling the quadrature axis current. The angle of the field coordinate system with respect to a stationary frame of reference defines a desired rotor flux angle, which is periodically determined and used to convert the desired direct and quadrature axis currents from the field coordinates into stator coordinates. A pulse width modulation circuit controls the active switches to produce stator electrical quantities.

The power converter is preferably a rectifier/inverter with a DC voltage link connected to an electrical energy storage device. The rectifier has active switches in a bridge configuration that control the currents and voltages at the generator side of the power converter, while the inverter has active switches in a bridge configuration that control the instantaneous currents at the line side of the power converter.

The stator electrical quantities that are regulated are either currents or voltages. When regulating currents, desired currents defined by the field oriented control are converted to desired stator currents, and the active switches of the power converter are controlled to produce corresponding stator currents. When regulating voltages, the desired field oriented currents are converted into desired field oriented voltages by compensating for cross-coupling between the direct and quandrature axes, the desired field oriented voltages are converted into desired stator voltages, and the active switches are controlled to produce corresponding stator voltages.

In one embodiment, the generator controller regulates the generator torque by controlling the stator currents at a low speed of rotation of the generator and by controlling the stator voltages at a higher speed of rotation of the generator. During low speed operation of the generator, the orientation of the rotor flux field with respect to the rotor is controlled by switching the active rectifier to regulate currents in the stator, while during the higher speed operation of the generator, the orientation of the rotor flux field is controlled by switching the active rectifier to regulate voltages in the stator. Switching between current control and voltage control is preferably controlled by a rotor speed signal that indicates rotor speed.

One embodiment of the current controller is particularly useful for controlling currents flowing into the power converter from the generator side and flowing out of the power converter at the line side. This current controller includes an algorithm that determines optimum PWM commutation signals by periodically determining and minimizing a distortion index indicative of errors between desired and actual currents, and controls the active switches of the power converter to produce currents that minimize the distortion index. This algorithm reduces total harmonic distortion over competing algorithms operating at comparable sampling frequencies, while reducing switching losses by reducing the number of switching events.

One feature of the preferred embodiment is the use of field orientation control of the rectifier to control generator torque. Field orientation decouples the torque-producing currents or voltages of the generator stator from the flux-producing currents or voltages and thus permits responsive control of generator torque.

Another feature is a hybrid control strategy for the rectifier in controlling either the stator currents or stator voltages. Current control is used where the stator currents can be assumed to be supplied by current sources, which is a valid assumption at low rotor speeds due to a large margin between the DC bus voltage of the rectifier and the counter emf of the generator. Voltage control is used at higher rotor speeds where current control would otherwise require increasing the DC bus voltage proportional to speed to maintain responsive control and constant volts/hertz operation. Voltage control has an increased power capability over current control at higher speeds while maintaining constant volts/hertz operation at moderate DC bus voltages, thus allowing the use of lower voltage switching devices than would be required for current control. Voltage control is also more efficient than current control at high speeds due to reduced switching losses in the rectifier due to lower DC bus voltages for the same power level. Under voltage control, the stator voltages in field coordinates are compensated by decoupling factors, so that two control voltages are developed, one for controlling torque and the other for controlling rotor flux.

At the line side of the power converter, the inverter controller of the present invention offers some of the same advantages as the generator controller in terms of efficient and low-distortion power conversion through the use of the current control algorithm that minimizes a distortion index. In addition, the inverter controller provides reactive power control by adjusting the output current between fully leading and fully lagging the output voltage, thereby supplying or absorbing selectable amounts of reactive power. Furthermore, the inverter controller can supply a selectable number of VARs either while operating or in a static VAR mode.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 16 is a schematic diagram of a preferred embodiment of the energy storage device that includes batteries in a series-parallel configuration.

FIG. 17 is a graphical illustration of average power output and energy storage for a wind turbine that has substantial energy storage capacity, and outputs substantially constant power over an interval of time.

FIG. 18 is a graphical illustration of average power output for a wind turbine having energy sources to supply power during periods of deficits in generated power.

FIG. 19 is a diagram of the proportional/integral multipler selector that produces the multiplier $I_{ref}$ for use with either inverter control unit.

FIG. 20 is a block diagram of a charge/discharge multiplier selector for use with an inverter control unit.

FIG. 21 is an exemplary graph of average generator power output and actual output energy to the grid, plotted as average power versus time.

FIG. 2B is a diagrammatic illustration of the second inverter control unit.

FIG. 25 is an illustration of a number of installed wind turbines whose output energy is collected in a power collection center and supplied to a utility grid that also receives energy from generators.

DETAILED DESCRIPTION OF THE INVENTION

FIGS. 1 through 25 of the drawings disclose aspects of the present invention for purposes of illustration only. One skilled in the art will readily recognize from the following discussion that alternative embodiments of the structures and methods illustrated herein may be employed without departing from the principles of the invention.

Figure 1:
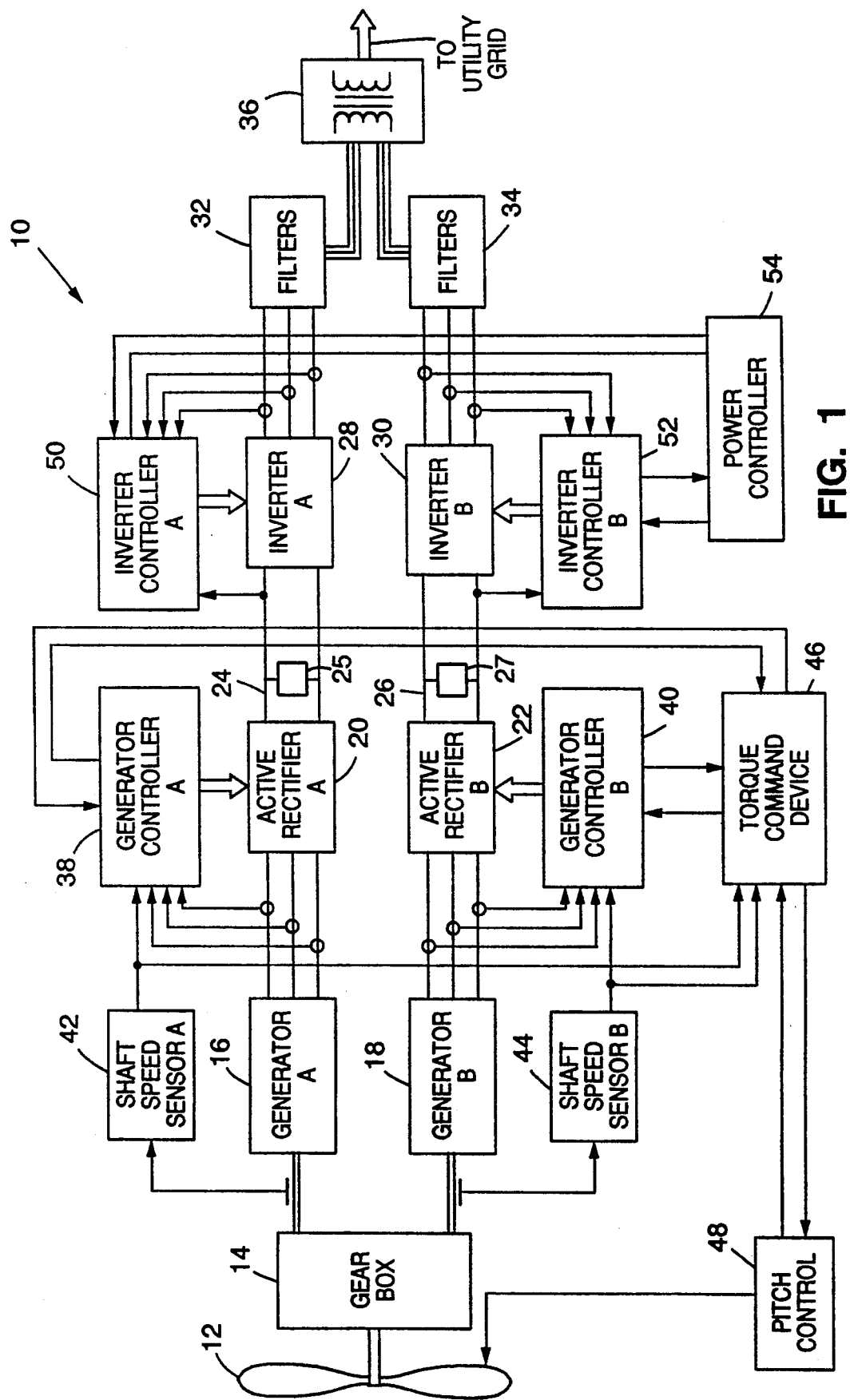
FIG. 1 is a block diagram of a wind turbine in accordance with the present invention.

As shown in FIG. 1, a wind turbine 10 includes a variable pitch turbine rotor 12 that is mechanically coupled through a gear box 14 to two 3-phase AC induction generators 16 and 18. The gear box 14 includes a fixed-ratio, step-up transmission, so that the generator rotors rotate at a fixed multiple of the speed of the turbine rotor. The generators 16 and 18 produce 3-phase AC electricity at a variable frequency that is proportional to the speed of the turbine rotor. The electricity generated by each generator 16 and 18 is converted from variable frequency AC to fixed frequency AC by power converters that comprise active rectifiers 20 and 22, DC voltage links 24 and 26, energy storage devices 25 and 27, inverters 28 and 30, and filters 32 and 34. The outputs of the filters 32 and 34 are combined at a transformer 36, the output of which is supplied to the utility grid.

The two generators, both of which rotate at all times whenever the turbine rotor rotates, are preferred over one generator in this embodiment in order to build a high capacity wind turbine while using readily available generators. The invention can, of course, be implemented in a wind turbine with only one generator or more than two generators.

Each of the generators 16 and 18 is controlled separately by generator controllers 38 and 40 which, as explained below, control the torque reacted by the generators by controlling the stator currents or voltages. Shaft speed sensors 42 and 44 monitor the rotor speed of the two generators, respectively, and supply rotor speed information to the generator controllers 38 and 40 and to a torque command device 46. The inverters 28 and 30 are controlled separately by inverter controllers 50 and 52. A power controller 54 directs the inverter controllers 50 and 52, as explained below, to provide control of real power flow and to provide control of reactive power by shifting the output current with respect to the output voltage.

The torque command device 46 monitors wind turbine performance parameters and generates torque control signals to the generator controllers 38 and 40 and pitch angle control signals to a pitch control unit 48. Stored within the torque command device 46 is a table of optimal values of torque, pitch angle, and rotor speed for various operating conditions. These values are given as a function of an estimated wind speed, which is determined by an aerodynamic model of the wind turbine having inputs of rotor speed from the speed sensors 42 and 44, measured pitch angle from the pitch control unit 48, and measured torque from the generator controllers 38 and 40. In order to improve the dynamic stability of the overall control system, a speed control signal is used to adjust the optimal values of pitch angle and torque found from the table. The speed control signal is proportional to the difference between the optimal desired speed from the table and the measured speed from the speed sensors 42 and 44. The torque command device 46 thus determines desired values of torque and pitch angle based on the sensed operating conditions and supplies torque and pitch angle control signals to the generator controllers 38, 40 and pitch control unit 48, respectively.

Figure 2:
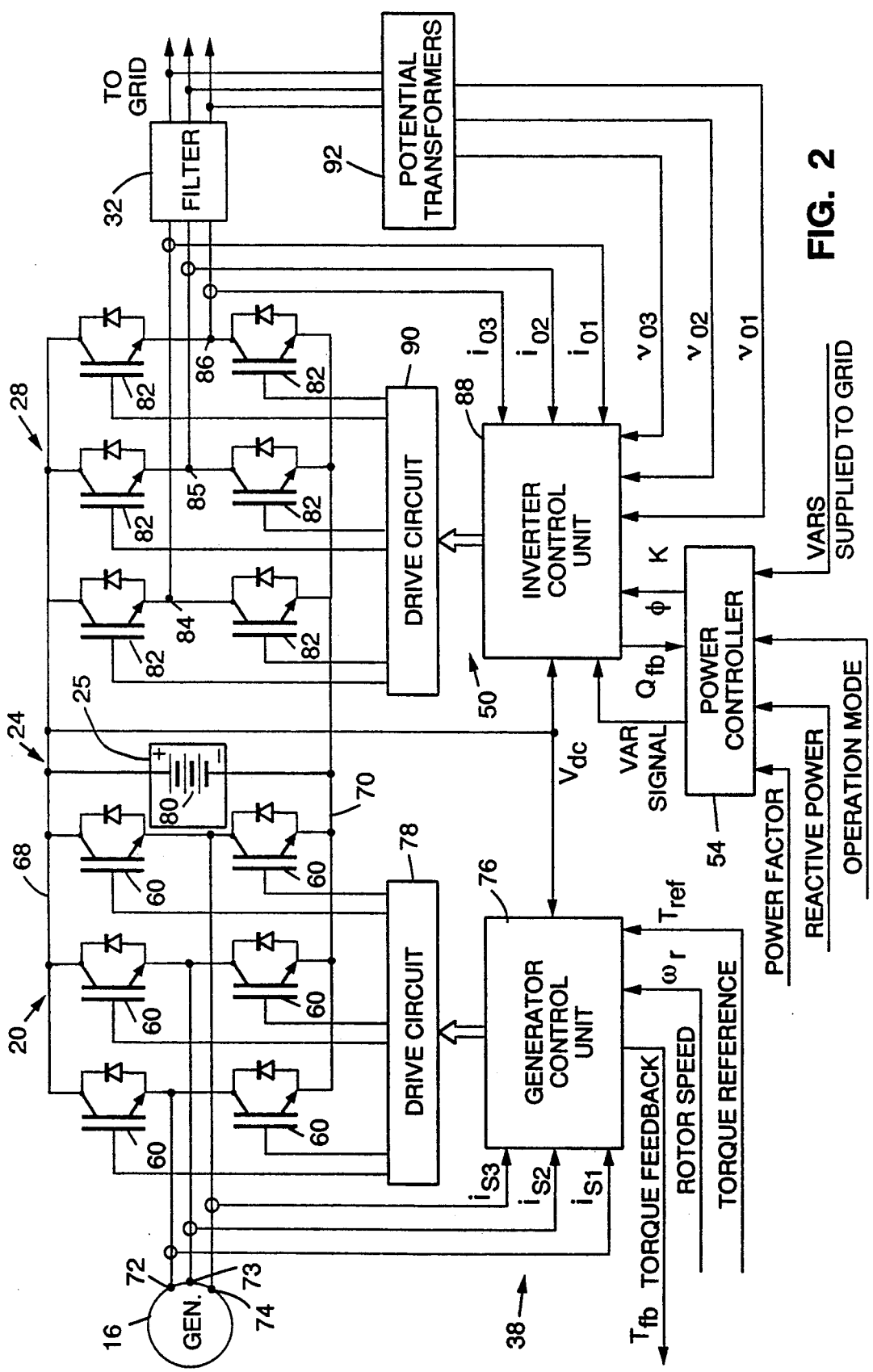
FIG. 2 is a schematic diagram of a power converter circuit and block diagram of associated control circuits of the present invention.

Broadly speaking, the power converter for each generator includes an active rectifier, a DC voltage link connected to an energy storage means, an inverter, filters, and associated controls. Both power converters are identical; only one will be explained. More particularly, as illustrated in FIG. 2, the active rectifier 20 includes three pairs of active switching devices 60 arranged in arranged in a bridge circuit between a +v rail 68 and a −v rail 70 of the DC voltage link 24 and each of three stator power taps 72-74 of the generator 16. Each pair of switching devices is coupled between the DC rails 68 and 70, and connected at an intermediate point to one of the stator power taps. Commutation signals that cause the active switching devices to switch on and off originate in a generator control unit 76, which supplies the signals to the switching devices through a drive circuit 78. The generator control unit 76 and drive circuit 78 are isolated from the rectifier 20 by optical isolators to minimize interference. The commutation signals are complementary for each pair of switching devices, causing one switching device of each pair to switch on and the other switching device of the pair to switch off, as appropriate to achieve the desired stator currents or voltages. The switching devices 60 of the rectifier 20 control the stator currents and voltages in the three phase stator windings.

The switching devices 60 of the rectifier can be any of the number of different types of active switches, including insulated gate bipolar transistors (IGBT), bipolar junction transistors, field effect transistors, Darlington transistors, gate turn-off thyristors, or silicon controlled rectifiers. In the preferred embodiment, the switching devices 60 of the rectifier are IGBTs.

The generator control unit 76, which is part of the generator controller 38, receives sensor inputs of the stator currents $i_{s1}$, $i_{s2}$, $i_{s3}$, and rotor speed $\omega_r$, receives a torque reference value $T_{ref}$ from the torque command device 46 (FIG. 1), and generates pulse width modulated (PWM) commutation signals that it supplies to the rectifier switches 60 through the drive circuit 78. Although FIG. 2 shows sensing of all three stator currents, only two currents need to be sensed because the third can be found from the relationship $i_{s1}+i_{s2}+i_{s3}=0$. The operation of the generator control unit 76 will be explained in further detail below. The DC voltage link 24 includes the +v rail 68 the −v rail 70. Connected between the two rails 68 and 70, the energy storage device 25 may include a battery 80 such as a lead-acid or nickel-cadmium type. FIG. 16 illustrates one battery configuration. To obtain high voltage (e.g. 750 volts) on the DC voltage link 24 with readily available batteries, the energy storage 25 may include a plurality of batteries 80 in a series configuration between the +v rail 68 and the −v rail 70. To provide increase energy storage in the energy storage device 25, a plurality of battery series may be situated in parallel between the +v rail 68 and the −v rail 70. This configuration of the energy storage device 25 is termed a "series-parallel" configuration.

As an alternative to the lead-acid battery, the energy storage device 25 may include any other conventional energy storage device: another type of battery, a SMES superconducting magnet, or a capacitor bank. Alternatively, energy storage devices including an electrochemical device such as a full cell, or a photovoltaic or solar cell may be used to provide electrical energy during deficits.

The amount of electrical storage required for a particular wind turbine is highly dependent upon the particular site, cost factors, and the ability of the electrical grid to make up for deficits without substantially affecting the frequency. If cost, size and maintenance of electrical energy storage devices were not factors, then a large energy storage would be advantageous for most uses. However, in any project, cost, size, and maintenance are common concerns. In a preferred embodiment, the energy storage device can absorb or supply 200-300KW for short periods of time such as 10-15 minutes.

Reference is made to FIG. 17, which is a graphical illustration of energy storage and withdrawal from the energy storage device 25. Power is plotted on the vertical axis vs. time on the horizontal axis. An interval of time during operation of the wind turbine is shown in FIG. 17. A line 81 shows the instantaneous output power from the generator fluctuating as a function of time. To obtain an appreciation of the time scale of FIG. 17, the time interval from time $t_0$ to time $t_6$ may be several minutes, for example. Such power fluctuations are typical in variable speed operation, in which the rotor speed (and thus the output power) varies with the wind over a time period. A line extending along the power level $P_1$ illustrates constant average output power for delivery to the grid. The area between the lines 81 shows the amount of energy storage into, or withdrawal from, the energy storage device 25. Thus, output power will remain approximately constant despite wind speed fluctuations on a short time scale. However, over longer time periods such as several minutes or more, the average output power may vary with the average wind speed.

In FIG. 17, specifically from time $t_0$ to $t_1$, an interval during which more energy is generated than supplied to the grid, energy is stored in the energy storage device 25. At time $t_1$, the generator power output drops below the power to be supplied to the utility grid, and thus from time $t_1$ until time $t_2$, some electrical energy is being withdrawn from the energy storage device 25. At time $t_2$, the generator output has again exceeded the average output power, and therefore, this excess energy is stored in the energy storage device until time $t_3$. The cycle continues throughout operation of the variable speed wind turbine, alternately charging and discharging the electrical energy storage device 25.

Reference is made to FIG. 18, which is a graphical illustration of power output for an alternative embodiment in which the energy storage device includes an energy source that provides output power during periods of deficits in generated power, but does not store substantial excess generated power during periods of excess generation. In these embodiments, the energy storage device may comprise a fuel cell which cannot be charged. The generated power is illustrated by a line 83, and the target real power is defined by a line extending from $P_2$. During a time interval from $t_7$ to $t_8$, excess power is generated at a level above $P_2$, and this energy is supplied to the grid. However, during the time interval $t_8$ to $t_9$, less power is generated than the target power $P_2$, and this power deficit is supplied from the energy source in order to maintain the average output power at $P_2$. Similarly, there is excess generated power during the time intervals between times $t_9$ and $t_{10}$, and times $t_{11}$ and $t_{12}$, and this excess energy is applied to the grid. And during the time intervals between times $t_{10}$ and $t_{11}$, and times $t_{12}$ and $t_{13}$, deficits in energy are maintained at $P_2$ with energy from the energy source. Similar concerns apply in embodiments that include solar cells or photovoltaics as an energy storage device instead of, or in addition to, the fuel cells discussed above.

From FIGS. 17 and 18, and the above discussion, it should be apparent that, preferably, the energy storage device 25 can supply substantial deficit energy during periods of deficits in generated power. And if energy storage device 25 can be charged, it should have sufficient capacity to store a substantial amount of the excess energy during intervals of excess generated power. The amount of that energy storage is highly dependent upon a number of factors including cost, size and maintenance of the batteries, or other energy storage devices, the expected windspeed fluctuations, and the grid's ability to make up for power deficits and fluctuations. For example, an electrical grid that meets a large portion of its needs by wind power would want a larger amount of electrical energy storage in the electrical storage device 25 in order to make up for deficits without substantially affecting the grid frequency; conversely, a smaller amount of energy storage would suffice if only a small portion of the electrical power requirements were supplied by wind turbines. As one example, the amount of energy storage in one embodiment is the amount necessary to supply 200 kilowatts for 5 minutes. In some embodiments, the amount of energy storage may have a value in the range of 200 Kw-min to 4000 Kw-min.

In other embodiments, if power fluctuation is not a problem, then a capacitor may be used as an energy storage device without affecting the ability to control real and reactive power. In such an instance where power fluctuation is not a problem, if each generator is rated at 150 kilowatts, the capacitance of the capacitor may be about 15,000 microfarads, and the nominal voltage of the DC link may be about 750 volts.

Although the voltage links 24,26 between the active rectifiers and the inverters may comprise any of a number of conventional bus configurations, in the preferred embodiment the bus structure is as set forth in a commonly assigned, copending patent application having Ser. No. 07/728,112, filed on Jul. 10, 1991 and entitled "Low-Noise Power Bus", the disclosure of which is incorporated by reference herein. In addition, the three phase power lines connected to the rectifiers and the inverters preferably comprise the configuration set forth in the referenced "Low-Noise Power Bus" patent application. As described in detail in that application, the power bus provides performance advantages including reduced magnetic emissions that reduce interference with sensitive switching equipment located nearby.

Situated on the other side of the DC voltage link from the active rectifier 20, the inverter 28 also includes three pairs of active switching devices 82 arranged in a bridge circuit between the +v rail 68 and −v rail 70 of the DC voltage link 24. The intermediate points of the pairs of active switching devices 82 form three output taps 84–86 from which three phase electricity flows through the filters 32 and transformer 36 to the utility grid. Commutation signals for the active switching devices 82 originate in an inverter control unit 88, which supplies the signals to the switching devices through a drive circuit 90. The inverter control unit 88 and drive circuit 90 are isolated from the inverter 28 by optical isolators. The commutation signals are complementary for each pair of switching devices, causing one switching device of each pair to switch on and the other switching device of the pair to switch off at any given time. In the preferred embodiment, the switching devices 82 of the inverter 28 comprise single IGBTs.

The inverter control unit 88, which is part of the inverter controller 50, receives sensor inputs of the inverter currents $i_{o1}$, $i_{o2}$, $i_{o3}$, inverter voltages $v_{o1}$, $v_{o2}$, $v_{o3}$, and DC link voltage $v_{dc}$. The inverter currents are sensed at the output taps, while the inverter voltages are sensed at the output of the filters 32 and are isolated through potential transformers 92. The inverter control unit 88 also receives, from the power controller 54, a power factor signal, a reactive power signal, and an operation mode signal, which define the desired power factor. In response, as will be explained in further detail below, the inverter control unit 88 generates pulse width modulated commutation signals and supplies them to the inverter switches 82 through the drive circuit 90. In addition, the inverter control unit 88 also supplies a feedback signal $Q_{fb}$, to the power controller 54 that indicates the reactive power being supplied by the inverter 50.

Figure 3:
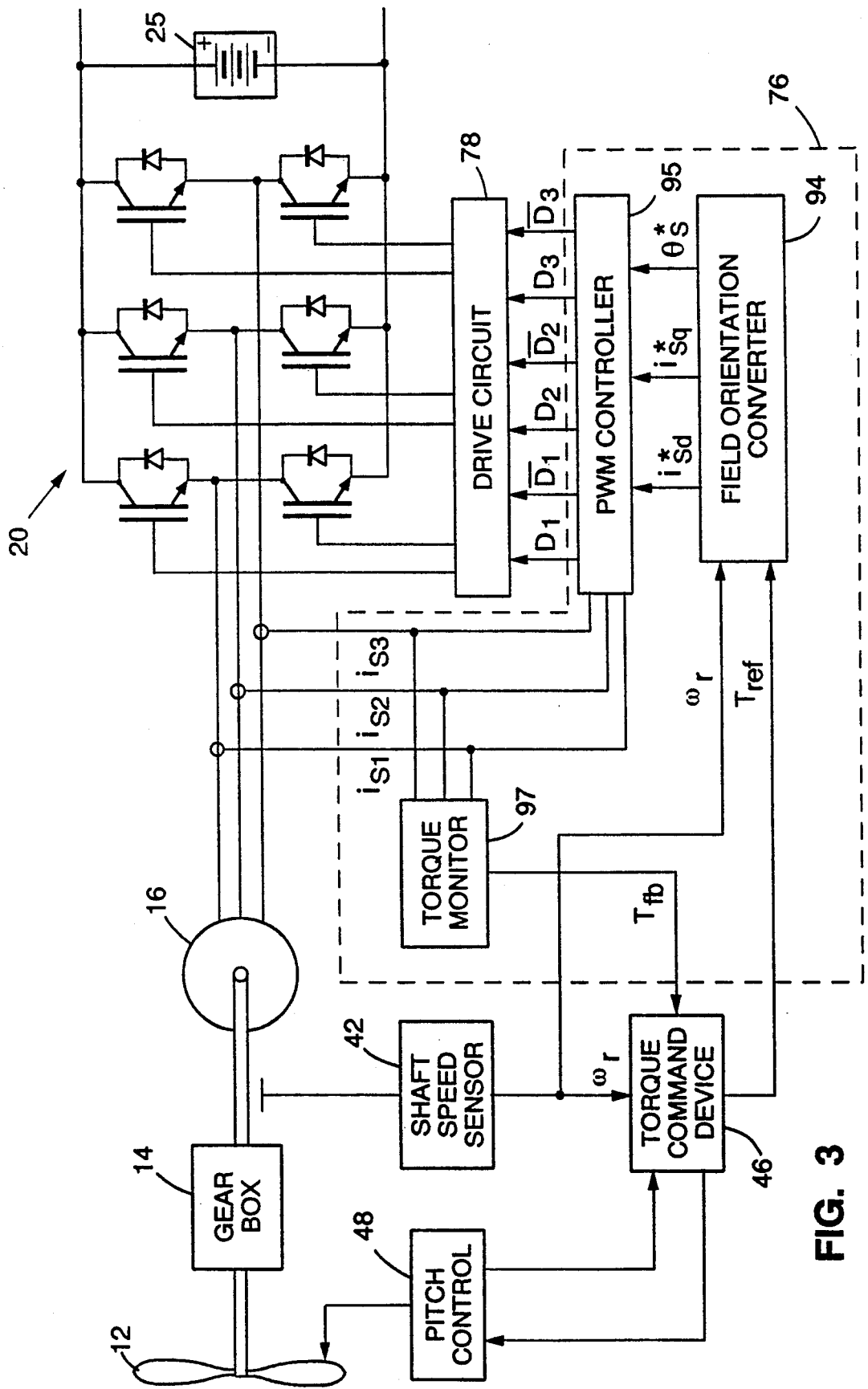
FIG. 3 is a block diagram of the control system used to control generator torque.

The control structure of the wind turbine is illustrated in FIG. 3 for one of the generators 16. The generator control unit 76 includes a field orientation converter 94 that converts the torque reference $T_{ref}$, and the rotor speed, $\omega_r$, into field oriented control currents $i_{sd}^*$ and $i_{sq}^*$, and a rotor flux angle, $\theta_s^*$. These control variables, which are identified as reference variables by the * superscript, are used by a PWM controller 95 along with the sensed 3 phase stator currents, $i_{s1}$, $i_{s2}$, $i_{s3}$, to generate the PWM commutation signals, $D_1$, $\overline{D}_1$, $D_2$, $\overline{D}_2$, $D_3$, $\overline{D}_3$. The notation $D_n$ and $\overline{D}_n$, for example, refers to the base drive signals for the upper ($D_n$) and lower ($\overline{D}_n$) devices of one pair of rectifier switches 60. The PWM controller 95, as will be described in more detail below, controls stator electrical quantities, either the stator currents or the stator voltages, depending on the rotor speed. A torque monitor 97 monitors the stator currents, generates a signal indicative of actual torque, $T_{fb}$, and feeds it back to the torque command device 46.

Controlling the generator currents and voltages in terms of field coordinates is a useful feature. The electric torque of an AC induction machine can be expressed in terms of the stator and rotor currents, but such an expression is difficult to use in a torque control system since the rotor currents of a squirrel-cage induction generator cannot be directly measured. Field orientation eliminates that difficulty.

Figure 4:
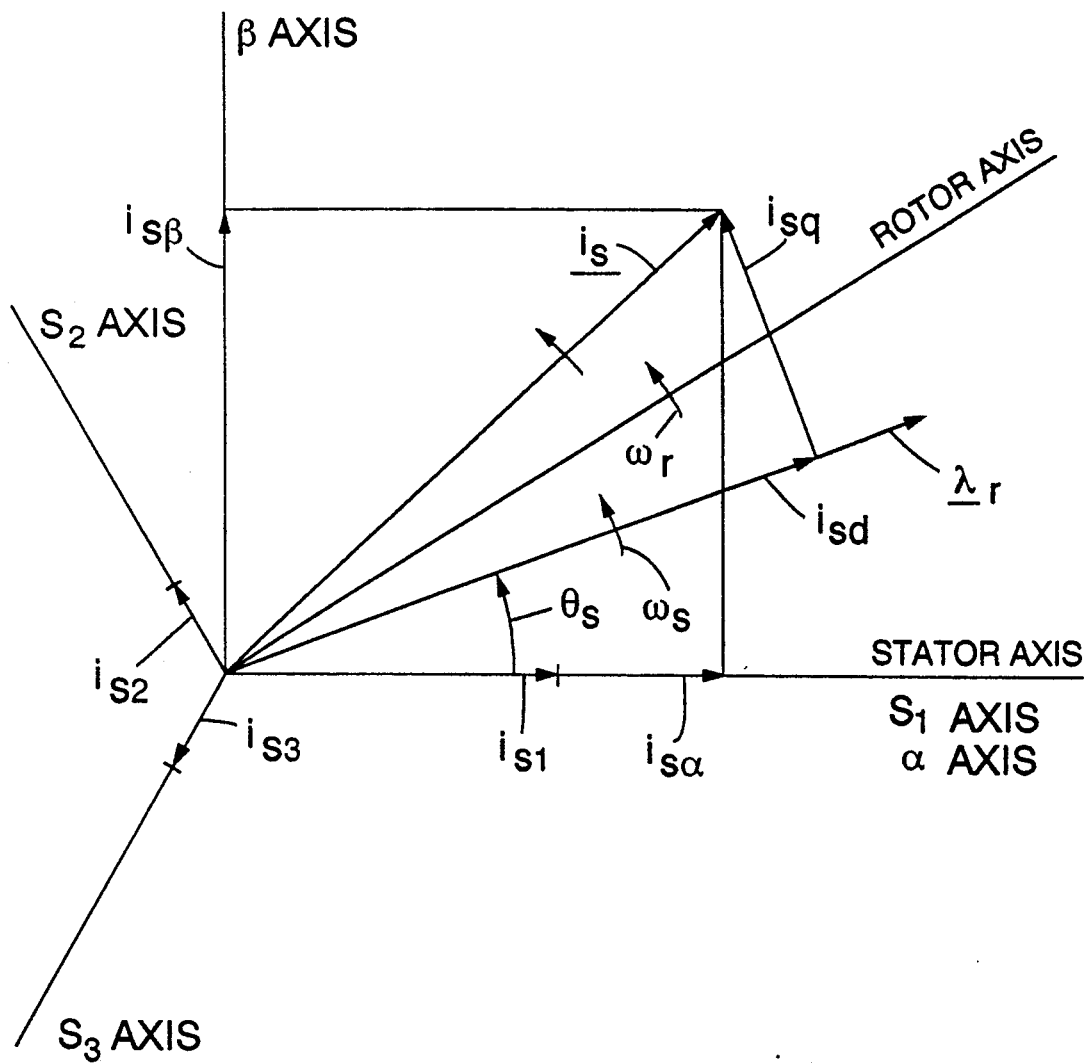
FIG. 4 is a graphical diagram illustrating the angular relationships between a fixed stator coordinate system, a rotating rotor coordinate system, and a rotating field oriented coordinate system.

It is useful to understand that, at any instant of time, the rotor flux of an induction machine can be represented by a radial vector $\underline{\lambda}_r$ vector with magnitude $\lambda_r$ and angle $\theta_s$. The field orientation principle defines the stator current in terms of rotating d, q coordinate system, where a direct (d) axis is aligned with the instantaneous rotor flux vector $\underline{\lambda}_r$ at angle $\theta_s$ and a quadrature (q) axis is perpendicular to the rotor flux vector. This is illustrated in FIG. 4. The stator current $i_s$ can be broken into a component, $i_{sd}$, that is parallel to the rotor flux $\lambda_r$ vector and a component, $i_{sq}$, that is perpendicular to the rotor flux vector. The currents $i_{sd}$ and $i_{sq}$ at angle $\theta_s$ are the field coordinate representation of the stator current vector.

FIG. 4 also illustrates that $\omega_r$ is defined as the rotor angular speed and $\omega_s$ is defined as the angular speed of the rotor flux vector. The machine slip speed, $\omega_{sl}$, which is the speed of the stator current vector with respect to the rotor, is the difference between $\omega_s$ and $\omega_r$.

The d, q coordinate system isolates or decouples a current that creates the rotor flux field, $i_{sd}$, on the direct axis, from a current that creates torque, $i_{sq}$, on the quadrature axis. Defining the generator currents in field orientation coordinates permits the generator control unit 76 to convert the torque control commands directly into a desired quadrature axis current, $i_{sq}^*$, which is then used by the PWM controller 95 to carry out the torque commands of the torque command device 46.

Controlling the generator in this manner requires conversion between stationary stator coordinates and rotating field coordinates. The stator currents in a balanced, 3-phase coordinate system, as represented by the currents on the three stator power taps 72-74 (FIG. 2), can be designated by the variables $i_{s1}$, $i_{s2}$, and $i_{s3}$. The balanced, 3-phase stator currents are equivalent to 2 phase stator currents, $i_{s\alpha}$ and $i_{s\beta}$, defined by the following matrix equation:

$$\begin{bmatrix} i_{s\alpha} \\ i_{s\beta} \\ 0 \end{bmatrix} = \begin{bmatrix} 1 & \cos(2\pi/3) & \cos(4\pi/3) \\ 0 & \sin(2\pi/3) & \sin(4\pi/3) \\ 1 & 1 & 1 \end{bmatrix} \begin{bmatrix} i_{s1} \\ i_{s2} \\ i_{s3} \end{bmatrix} \quad (1)$$

The 2-phase stator currents, $i_{s\alpha}$ and $i_{s\beta}$, can be converted into the field coordinate currents, $i_{sd}$ and $i_{sq}$, as a function of the rotor flux angle, $\theta_s$, by the following transformation:

$$\begin{bmatrix} i_{sd} \\ i_{sq} \end{bmatrix} = \begin{bmatrix} \cos\theta_s & \sin\theta_s \\ -\sin\theta_s & \cos\theta_s \end{bmatrix} \begin{bmatrix} i_{s\alpha} \\ i_{s\beta} \end{bmatrix} \quad (2)$$

Transformation from field coordinates to 2-phase coordinates is accomplished by inverting equation (2), which results in the following:

$$\begin{bmatrix} i_{s\alpha} \\ i_{s\beta} \end{bmatrix} = \begin{bmatrix} \cos\theta_s & -\sin\theta_s \\ \sin\theta_s & \cos\theta_s \end{bmatrix} \begin{bmatrix} i_{sd} \\ i_{sq} \end{bmatrix} \quad (3)$$

Transformation from 2-phase to balanced 3-phase coordinates is found by inverting equation (1):

$$\begin{bmatrix} i_{s1} \\ i_{s2} \\ i_{s3} \end{bmatrix} = \begin{bmatrix} 2/3 & 0 & 1/3 \\ -1/3 & 1/\sqrt{3} & 1/3 \\ -1/3 & 1/\sqrt{3} & 1/3 \end{bmatrix} \begin{bmatrix} i_{s\alpha} \\ i_{s\beta} \\ 0 \end{bmatrix} \quad (4)$$

Representations of the stator current vector in the rotating d, q field coordinate system, in the stationary 2-phase $\alpha,\beta$ coordinate system, and in the stationary balanced 3-phase coordinate system are shown in FIG. 4.

Figure 5:
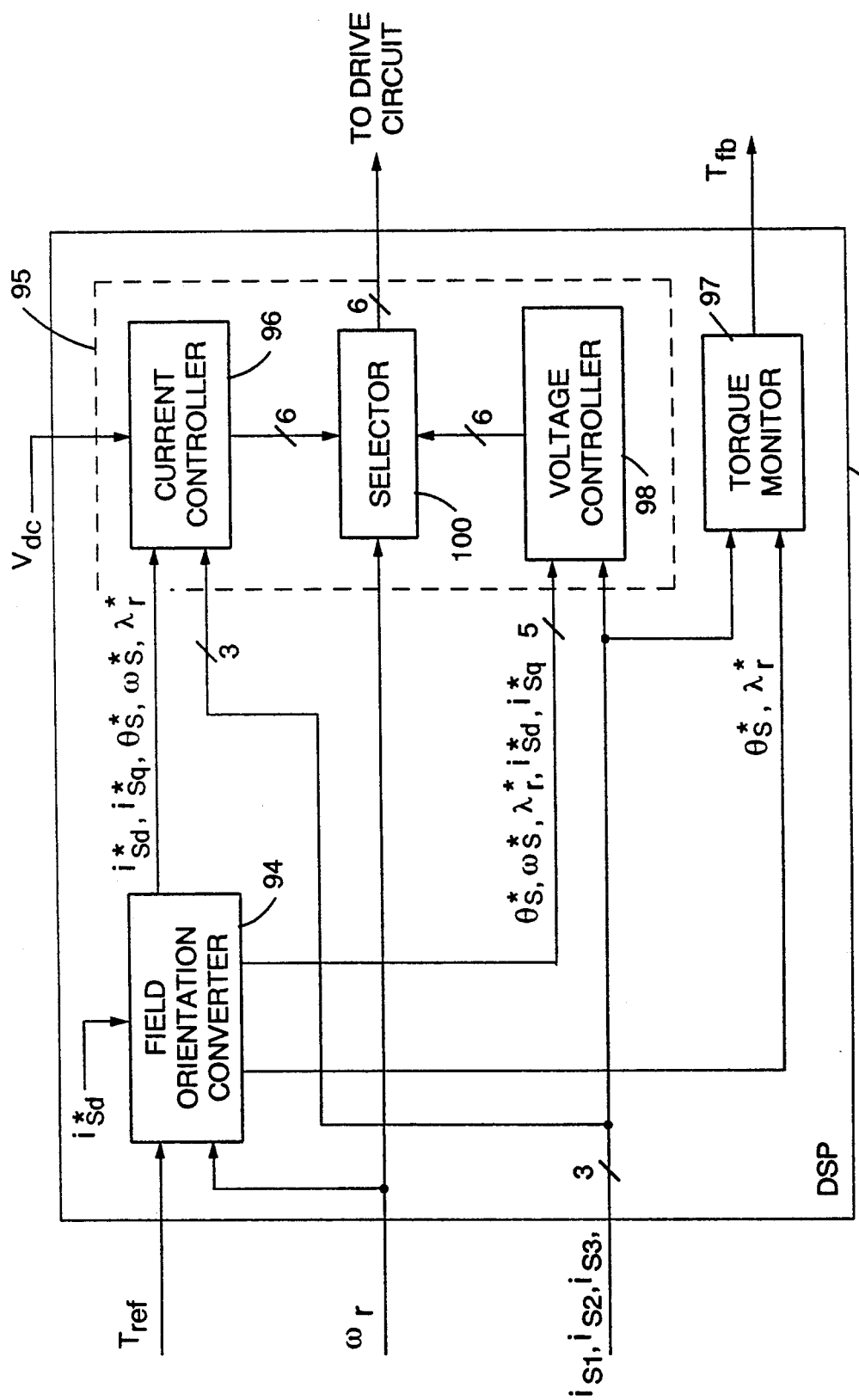
FIG. 5 is a block diagram of a generator control unit of the present invention.

The structure of the generator control unit 76 is shown in block diagram form in FIG. 5. The generator control unit is preferably implemented in a digital signal processor ("DSP"), a Texas Instruments model TMS320C25. Computer code for implementing the invention in a DSP is disclosed in the microfiche appendix.

Functionally, the generator control unit 76 includes the field orientation converter 94, the torque monitor 97, and the PWM controller 95. In the preferred embodiment, the PWM controller 95 includes a current controller 96, a voltage controller 98, and a selector circuit 100. These components will be explained in more detail below, but generally, the field orientation converter 94 generates control parameters based on the rotor speed and torque reference signals, the current controller 96 or the voltage controller 98 generates PWM communication signals for the active switching devices 60, and the selector circuit 100 chooses which of the PWM commutation signals to output to the drive circuit 78. The torque monitor 97 senses the actual stator currents, $i_{s1}$, $i_{s2}$, $i_{s3}$, converts them to field coordinate values using equations (1) and (2), and calculates a torque signal, $T_{fb}$, using equation (8) (see below) for feedback to the torque command device 46. The torque monitor 97 thus infers generator torque from the measured currents. The computations performed within the DSP of the generator control unit 76 are digital, which requires A/D conversion of the external signals.

Figure 6:
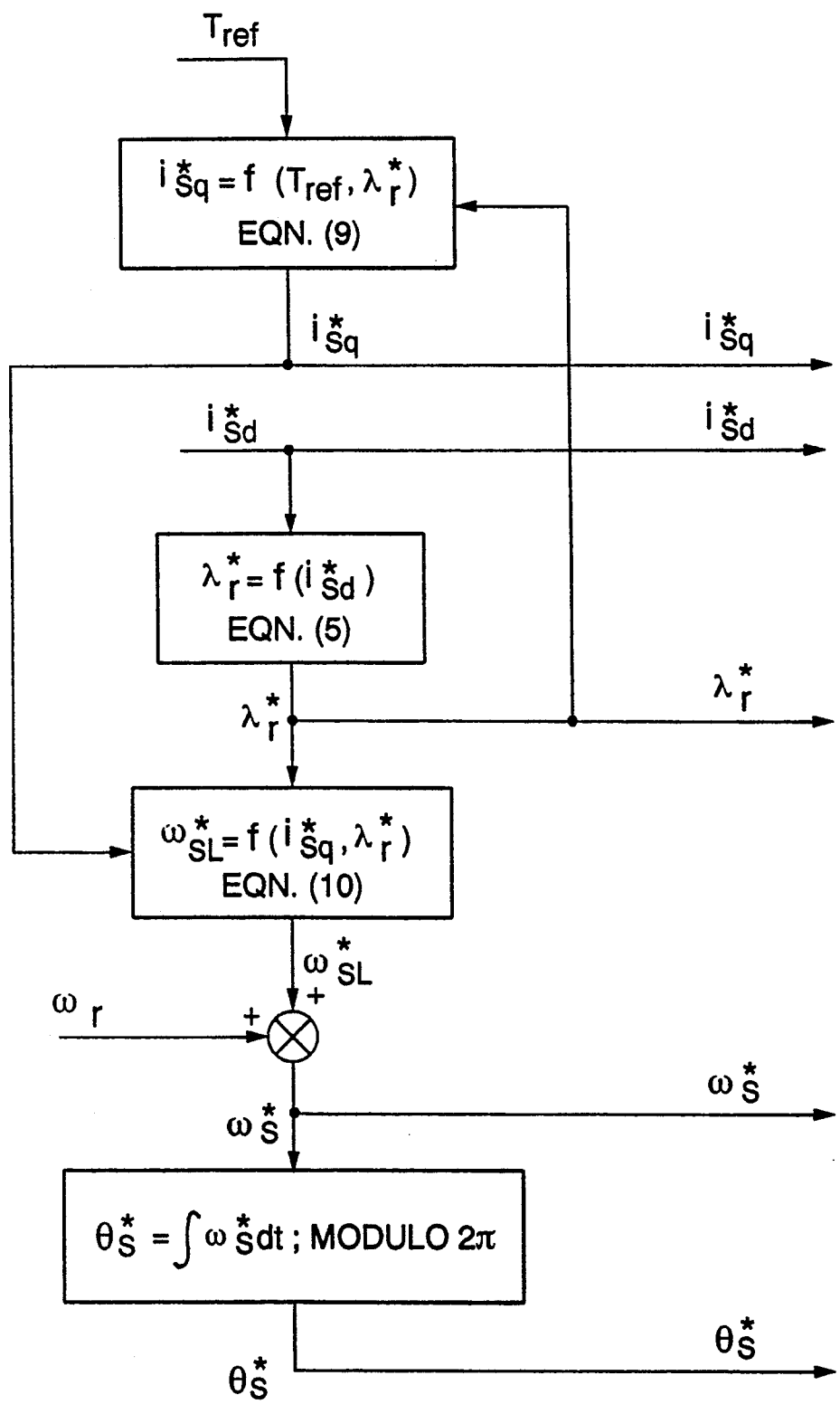
FIG. 6 is a block diagram of a field orientation converter of the present invention.

The field orientation converter 94, illustrated in FIG. 6, converts the torque control and rotor flux signals into field coordinates. Using a desired direct axis current, $i_{sd}^*$, the field orientation converter 94 computes the desired magnitude of the rotor flux, $\lambda_r^*$. The desired flux-producing direct axis current, $\lambda_r^*$, is a function of the particular generator used, and can be predetermined and stored in the DSP. In the preferred embodiment, $i_{sd}^*$, is assumed to be constant. Alternatively, $i_{sd}^*$, can be varied to provide field weakening control, if desired.

The notation * designates a desired value generated by the control system as opposed to an actual value.

The desired rotor flux, $\lambda_r^*$, is defined by the following equation:

$$\dot{\lambda}_r^* = \frac{-R_r \lambda_r^*}{L_r} + \frac{R_r L_o i_{sd}^*}{L_r} \quad (5)$$

where:
$\lambda_r^*$ = desired rotor flux;
$\dot{\lambda}_r^*$ = time derivative of desired rotor flux;
$R_r$ = rotor resistance;
$L_o$ = mutual inductance;
$L_r$ = rotor self inductance. In the general case, equation (5) can be represented by the following recursive equation:

$$\lambda_{r(k)}^* = \lambda_{r(k-1)}^* - \frac{\Delta t\, R_r \lambda_{r(k-1)}^*}{L_r} + \frac{\Delta t\, R_r L_o i_{sd(k-1)}^*}{L_r} \quad (6)$$

where:
$\lambda_r^*{}_{(k)} = \lambda_r^*$ at time = k;
$\lambda_r^*{}_{(k-1)} = \lambda_r^*$ at time = k-1;
$i_{sd}^*{}_{(k-1)} = i_{sd}^*$ at time = k-1;
$\Delta t$ = sample time period between time = k-1 and time = k.

In the case where $i_{sd}^*$ is constant, the time derivative $\dot{\lambda}_r^* = 0$, so that equation (6) simplifies to:

$$\lambda_r^* = L_o i_{sd}^* \quad (7)$$

Once the rotor flux is known, the torque reference can be converted into quadrature axis current. In field coordinates, the torque reacted by the generator is given by:

$$T = \frac{P L_o \lambda_r i_{sq}}{3 L_r} \quad (8)$$

where:
T = generator torque;
P = number of generator poles;
$i_{sq}$ = quadrature axis current. Solving equation (8) for $i_{sq}$, yields the following expression for desired torque-producing quadrature axis current as a function of the torque reference supplied by the torque command device 46:

$$i_{sq}^* = \frac{3 L_r T_{ref}}{P L_o \lambda_r^*} \quad (9)$$

where $T_{ref}$ is the torque reference signal supplied to the generator control unit by the torque command device 46.

Once the desired rotor flux, $\lambda_r^*$, and desired quadrature axis current, $i_{sq}^*$, have been determined, the desired rotor flux angle, $\theta_s^*$, at a particular instant of time can be found. This is accomplished by solving the following equations:

$$\omega_{sl}^* = \frac{R_r L_o i_{sq}^*}{L_r \lambda_r^*} \quad (10)$$

$$\omega_s^* = \omega_r + \omega_{sl}^* \quad (11)$$

$$\theta_s^* = \int \omega_s^* dt, \quad 0 \leq \theta_s^* \leq 2\pi \quad (12)$$

where:
$\omega_{sl}^*$ = desired machine slip speed;
$\omega_s^*$ = desired rotor flux speed;
$\omega_r$ = actual rotor speed;
$\theta_s^*$ = desired instantaneous rotor flux angle.

Machine slip speed, $\omega_{sl}^*$, is found from the calculated values of desired rotor flux, $\lambda_r^*$, and desired quadrature axis current, $i_{sq}^*$, using equation (10). The measured rotor speed, $\omega_r$, is then added to the machine slip speed, $\omega_{sl}^*$, to find the desired rotor flux speed, $\omega_s^*$, according to equation (11). The desired rotor flux speed, $\omega_s^*$, is then integrated modulo $2\pi$ to find the desired instantaneous rotor flux angle, $\theta_s^*$.

The computed values for desired field oriented currents, $i_{sd}^*$ and $i_{sq}^*$, rotor flux, $\lambda_r^*$, rotor flux speed, $\omega_s^*$, and rotor flux angle, $\theta_s^*$, are available to the current and voltage controllers 96 and 98 (FIG. 5) for determination of the PWM commutation signals. Transformation of the desired stator currents from field coordinates into stationary 2-phase $\alpha,\beta$ coordinates or balanced 3-phase coordinates, if required by the PWM controller, can be accomplished either in the field orientation converter or in the PWM controller. Here, it is assumed that the transformations occur outside of the field orientation converter 94.

In response to the values computed by the field orientation converter 94, either the current controller 96 of the voltage controller 98, depending on which is selected, determines switch states for the active switching devices (FIG. 5). The current controller 96 generates PWM commutation signals by choosing a switch state that causes stator currents to approximate the desired currents defined by the field orientation converter. The voltage controller 98 generates PWM commutation signals by converting the desired field oriented currents into desired field oriented voltages, transforming them into stator coordinates, and then selecting the appropriate switch state to obtain the desired stator voltages.

Figure 7:
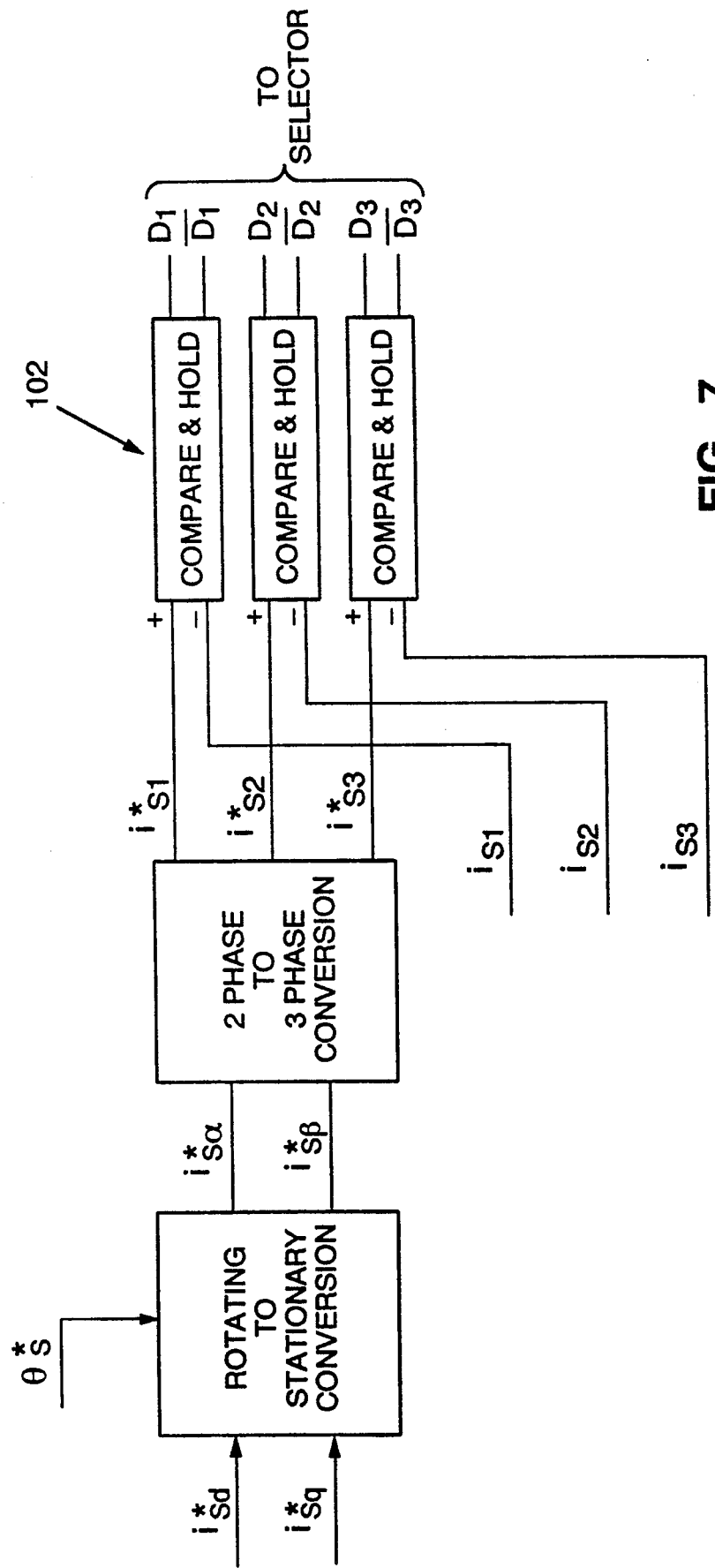
FIG. 7 is a block diagram of a delta modulator current controller of the present invention.

One simple method of current control is illustrated in FIG. 7, a delta modulator current controller. The delta modulator current controller converts the desired field oriented currents into stationary 2-phase stator coordinates, and then to 3-phase stator currents, $i_{s1}^*$, $i_{s2}^*$, $i_{s3}^*$.

Transforming the desired currents from rotating field coordinates to stationary 2-phase $\alpha,\beta$ coordinates is achieved by equation (3), which reduces to the following:

$$i_{s\alpha}^* = i_{sd}^* \cos \theta_s^* - i_{sq}^* \sin \theta_s^* \quad (13)$$

$$i_{s\beta}^* = i_{sd}^* \sin \theta_s^* + i_{sq}^* \cos \theta_s^* \quad (14)$$

The desired stator currents are then transformed into 3-phase coordinates using equation (4).

After converting the desired stator currents from field coordinates into 3-phase coordinates, the delta modulator current controller then periodically compares each desired stator current $i_{s1}^*$, $i_{s2}^*$, $i_{s3}^*$, with the corresponding actual stator current $i_{s1}$, $i_{s2}$, $i_{s3}$, using compare and hold devices 102. If the desired stator current for a phase is greater than the actual stator current, then the upper switching device is switched on and the lower switching device switched off, otherwise, the upper device is switched on and the lower device is switched off. The compare and hold devices 102 set the PWM commutation signals, $D_1$, $\overline{D}_1$, $D_2$, $\overline{D}_2$, $D_3$, $\overline{D}_3$ to accomplish the desired switching. The switch state so selected remains in effect until the next sample period occurs, at which time the comparisons are performed with updated actual and desired values.

Figure 8:
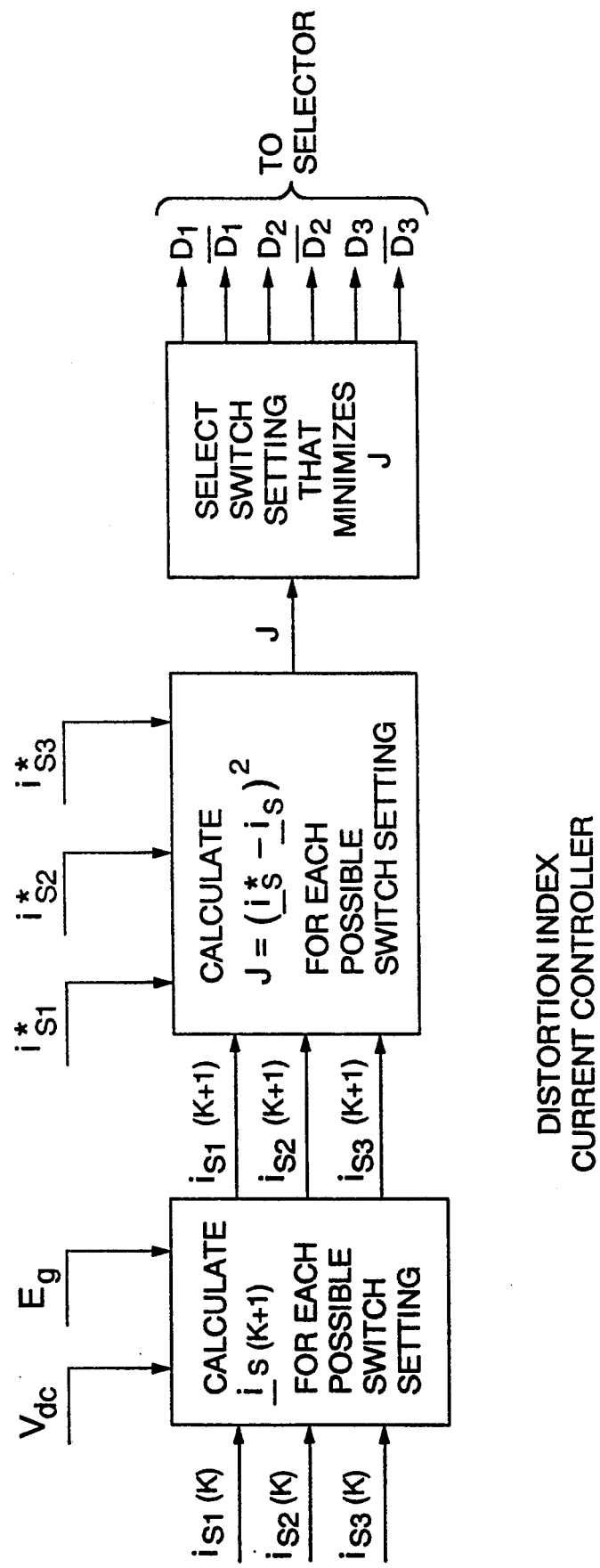
FIG. 8 is a block diagram of a distortion index current controller of the present invention.
Figure 9:
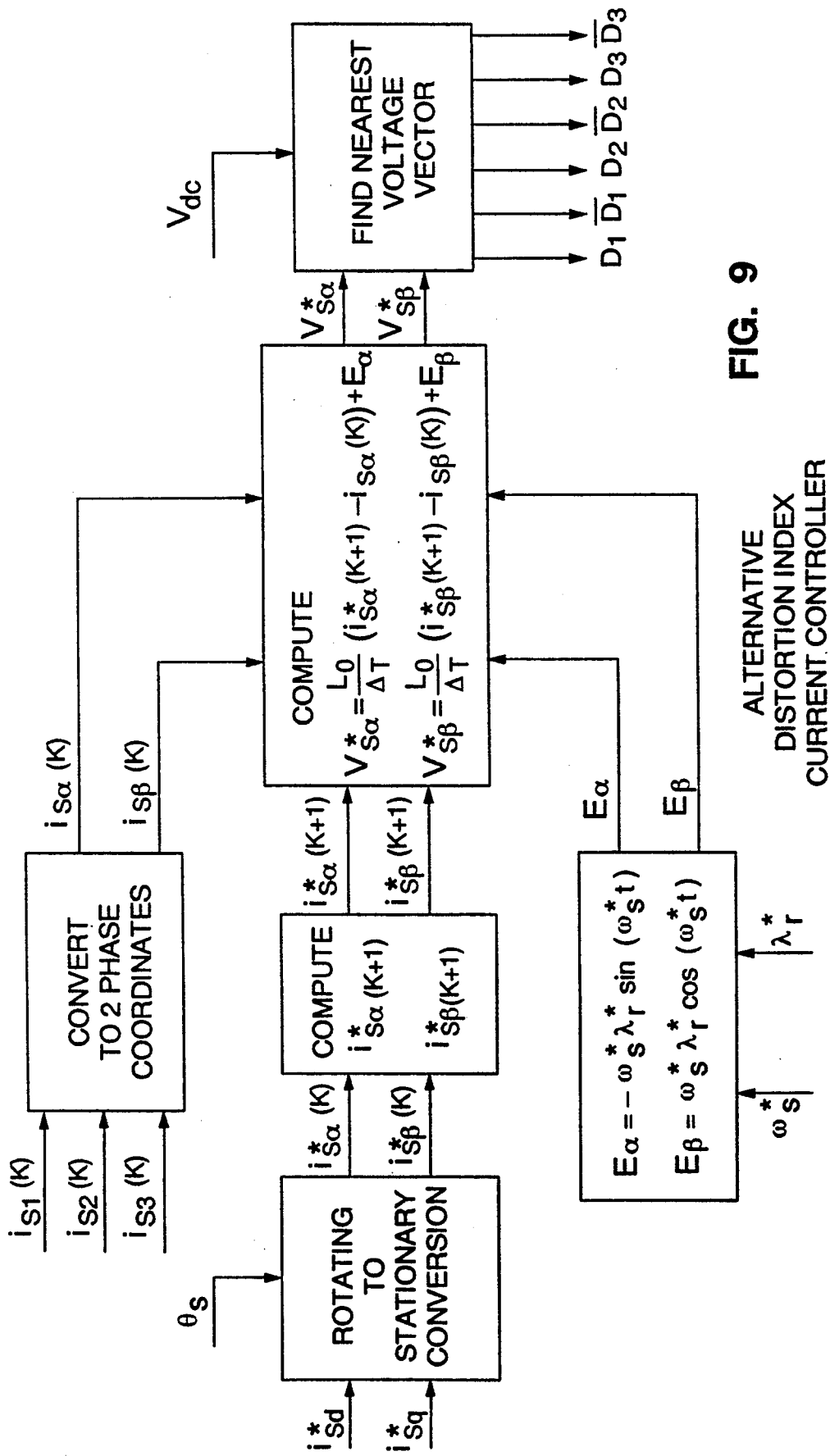
FIG. 9 is a block diagram of an alternative implementation of the distortion index current controller of FIG. 8.
Figure 10:
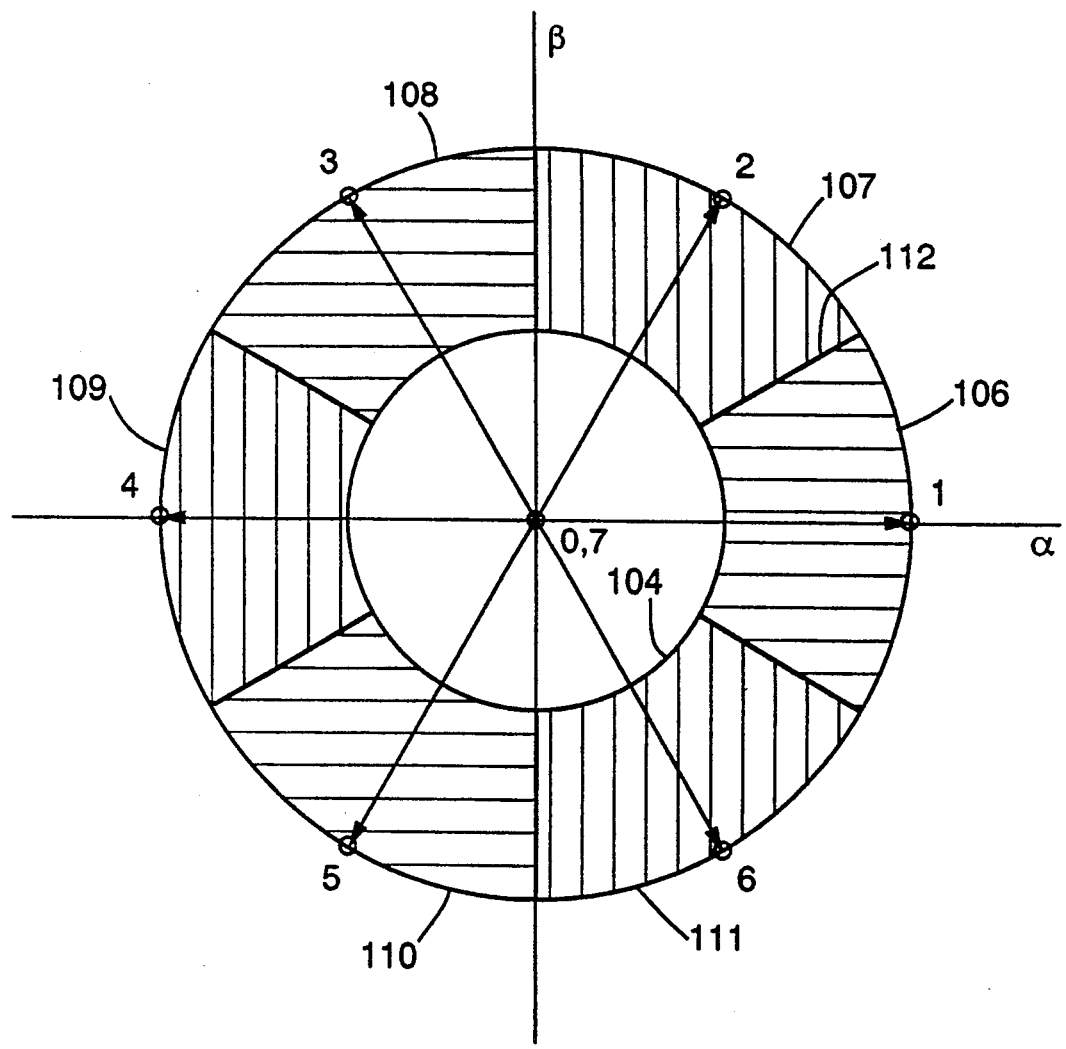
FIG. 10 is a graphical representation, in $\alpha,\beta$ coordinates, of voltage vectors resulting from eight possible switch states of the active rectifier.

Another method of current control, one that minimizes a distortion index, is illustrated in FIGS. 8-10. This method generates PWM signals by periodically minimizing a distortion index related directly to total harmonic distortion (THD). In comparison with the delta modulator current controller or with a linear controller with triangular crossing, this method is preferable due to lower THD at comparable frequencies, while requiring fewer switching events and, consequently, less power loss due to switching. The distortion index that is minimized may be defined as the sum of the squares of the current errors:

$$J_1 = (i_{s1}^* - i_{s1})^2 + (i_{s2}^* - i_{s2})^2 + (i_{s3}^* - i_{s3})^2 \tag{15}$$

where $i_{s1}^*$, $i_{s2}^*$, $i_{s3}^*$ are the desired 3-phase stator currents, and $i_{s1}$, $i_{s2}$, $i_{s3}$ are the actual 3-phase stator currents. Alternatively, the distortion index can be defined as the sum of the absolute values of the current errors.

$$J_2 = |i_{s1}^* - i_{s1}| + |i_{s2}^* - i_{s2}| + |i_{s3}^* - i_{s3}| \tag{16}$$

Minimizing the distortion index, J, involves determining which of eight possible switch states of the rectifier switches will produce actual stator currents nearest in value to the desired stator currents. One way to accomplish this is shown in FIG. 8. Switching decisions are made periodically, based on the most recently measured stator currents. The actual stator currents $i_{s1}(K)$, $i_{s2}(K)$, and $i_{s3}(k)$, are measured at time = k, and a projection is made of the stator currents $i_{s1}(k+1)$, $i_{s2}(k+1)$, and $i_{s3}(k+1)$ at the next interval of time, for each possible switch state. Since there are two possible switch settings for each of the three switch pairs, there are eight ($2^3$) possible switch states for the rectifier switches. The projected stator currents $i_{s1}(k+1)$, $i_{s2}(k+1)$, and $i_{s3}(k+1)$ are found by modeling the generator and rectifier according to the following equation derived from a simplified model:

$$\underline{V} = \underline{E} + L_o \frac{d}{dt} (\underline{i_s}) \tag{17}$$

where
$\underline{V}$ = voltage vector resulting from a particular switch state;
$\underline{E}$ = generator emf vector;
$\underline{i_s}$ = stator current vector.
Evaluating the derivative over a discrete time interval, $\Delta t$, yields the following for the projected currents:

$$i_s(k+1) = \frac{\Delta t}{L_o} (\underline{V}(k) - \underline{E}(k)) + \underline{i_s}(k) \tag{18}$$

The projected stator currents can thus be found for each switch state by evaluating equation (18) using the voltage vector that would result from that switch state.

After the projected stator currents are found, the distortion index, J, can be computed by equations (15) or (16) for each possible switch state. The switch state that yields the minimum value of J is output to the selector 100.

While the above-described method will define a switch state that minimizes the distortion index, another equivalent method if preferable due to its reduced computational overhead. The alternative method of computing the switch state that minimizes the distortion index is illustrated in FIGS. 9 and 10. This method converts the desired stator current vector into an equivalent desired voltage vector. This method in effect minimizes an equivalent distortion index defined in the $\alpha, \beta$ coordinate system with respect to voltage error:

$$J_3 = (v_{s\alpha}^* - v_{s\alpha})^2 + (v_{s\beta}^* - v_{s\beta})^2 \tag{19}$$

or $$J_4 = |v_{s\alpha}^* - v_{s\alpha}| + |v_{s\beta}^* - v_{s\beta}| \tag{20}$$

where
$v_{s\alpha}^*$ = desired $\alpha$ axis voltage;
$v_{s\alpha}^*$ = desired $\beta$ axis voltage;
$v_{s\alpha}$ = actual $\alpha$ axis voltage;
$v_{s\beta}$ = actual $\beta$ axis voltage.

It can be shown that minimizing the voltage differences of equations (19) or (20) is equivalent to minimizing the current differences of equations (15) or (16), since the distortion indices vary only by constant or proportional factors. Due to this equivalence, minimizing the distortion index defined by equations (19) or (20) does control the stator currents, even though the desired currents are converted into desired voltages for evaluating the distortion index.

As shown in FIG. 9, computations are carried out using the 2-phase $\alpha, \beta$ coordinate system instead of the 3-phase coordinate system in order to eliminate some redundant computational steps. The measured 3 phase stator currents, $i_{s1}$, $i_{s2}$, and $i_{s3}$, are converted into the 2-phase $\alpha, \beta$ coordinate system using equation (1). The desired field coordinate currents, $i_{sd}^*$ and $i_{sq}^*$, as received from the field orientation converter 94 (FIG. 5), are converted into desired $\alpha, \beta$ stator currents at time (k), $i_{s\alpha}^*(k)$ and $i_{s\alpha}^*(k)$, using equation (3). These values are projected forward in time using the formulas:

$$i_{s\alpha}^*(k+1) = 2i_{s\alpha}^*(k) - i_{s\alpha}^*(k-1) \tag{21}$$

$$i_{s\beta}^*(k+1) = 2i_{s\beta}^*(k) - i_{s\beta}^*(k-1) \tag{22}$$

The generator emf, in $\alpha, \beta$ coordinates, is estimated by:

$$E_\alpha = \lambda_r^* \frac{d}{dt} (\cos \theta_s^*) = \omega_s^* \lambda_r^* \sin(\omega_s^* t) \tag{23}$$

$$E_\beta = \lambda_r^* \frac{d}{dt} (\sin \theta_s^*) = \omega_s^* \lambda_r^* \cos(\omega_s^* t) \tag{24}$$

The desired voltages in $\alpha, \beta$ coordinates, $v_{s\alpha}^*$ and $v_{s\beta}^*$, are estimated by the generator model of equation (17), which defines the following equations:

$$v_{s\alpha}^* = \frac{L_o (i_{s\alpha}^*(k+1) - 1_{s\alpha})}{\Delta t} + E_\alpha \tag{25}$$

$$v_{s\beta}^* = \frac{L_o (i_{s\beta}^*(k+1) - 1_{s\beta})}{\Delta t} + E_\beta \tag{26}$$

Next, instead of solving equation (19) or (20) for each possible switch state, the desired $\alpha$ and $\beta$ axis voltages, $v_{s\alpha}^*$ and $v_{s\beta}^*$, are compared to the limited number of voltage vectors that could result from the eight possible switch states. These voltage vectors, shown in FIG. 10, have a magnitude of either zero or the DC link voltage, $v_{dc}$, and are aligned with the $s_1$, $s_2$, and $s_3$ axes. The voltage vectors are defined according to the following table:

| State | Switch Setting | $(v_{s\alpha}, v_{s\beta})$ |
|-------|----------------|------------------------------|
| 1 | $[\bar{D}_1, \bar{D}_2, \bar{D}_3]$ | $v_{dc}(0, 0)$ |
| 2 | $[D_1, \bar{D}_2, \bar{D}_3]$ | $v_{dc}(1, 0)$ |
| 3 | $[D_1, D_2, \bar{D}_3]$ | $v_{dc}(1/2, \sqrt{3}/2)$ |
| 4 | $[\bar{D}_1, D_2, \bar{D}_3]$ | $v_{dc}(-1/2, \sqrt{3}/2)$ |
| 5 | $[\bar{D}_1, D_2, D_3]$ | $v_{dc}(-1, 0)$ |
| 6 | $[\bar{D}_1, \bar{D}_2, D_3]$ | $v_{dc}(-1/2, -\sqrt{3}/2)$ |
| 7 | $[D_1, \bar{D}_2, D_3]$ | $v_{dc}(1/2, -\sqrt{3}/2)$ |
| 8 | $[D_1, D_2, D_3]$ | $v_{dc}(0, 0)$ |

Since states 0 and 7 define the same zero voltage, there are seven possible stator voltages that could result from the eight possible switch settings of the active switching devices of the rectifier.

Minimizing the distortion index is accomplished by finding which stator voltage vector is closest to the desired voltage vector defined by $v_{s\alpha}^*$ and $v_{s\beta}^*$. Graphically, the $\alpha,\beta$ coordinate space can be divided into seven regions: an inner circle 104 of radius $v_{dc}/2$, plus six 60° sectors 106-111 of outer radius $v_{dc}$ surrounding the inner circle, each sector having a switch state centered at the outer radius thereof.

Determining the closest voltage vector is a matter of finding in to which region the desired voltage vector falls. To do so, the magnitude of the desired voltage vector is first compared to $v_{dc}/2$ to determine whether the desired voltage vector falls within the inner circle 104. If the magnitude of the desired voltage vector is less than one-half of $v_{dc}$, then state 0 or state 7 is the desired switch state. Choosing between state 0 and state 7 is accomplished by selecting the state that requires the fewest number of switches to change state from the previous switch setting.

Next, if the magnitude of the desired voltage vector exceeds vdc/2, then the signs of $v_{s\alpha}^*$ and $v_{s\beta}^*$ are examined to determine in which quadrant the voltage vector falls. If the sign of $v_{s\alpha}^*$ is positive, then states 1,2, or 6 are candidates, and, if negative, then states 3,4 or 5 are candidates. if both $v_{s\alpha}^*$ and $v_{s\beta}^*$ are positive, for example, then either state 1 or state 2 is the closest voltage vector. For $v_{s\alpha}^*$ and $v_{s\beta}^*$ positive, state 1 is closest if $v_{s\alpha}^* > \sqrt{3} v_{s\beta}^*$, otherwise state 2 is closest. This is so because a dividing line 112 between sector 106 of state 1 and sector 107 of state 2 is inclined at 30° to the $\alpha$ axis, and because:

$$\tan 30° = \frac{v_{s\beta}^*}{v_{s\alpha}^*} = \frac{1}{\sqrt{3}}$$

The selections between states 3 and 4, 4 and 5, and 1 and 6 in the other quadrants are developed in the same manner. Once the closest voltage vector is found, the switch state associated with that voltage vector is output to the selector 100.

Referring back to FIG. 5, operation with the current controller 96 generating the PWM commutation signals occurs at relatively low speeds, where the DC voltage link offers substantial ceiling voltage. In that situation, the current controller 96 keeps the stator currents in close agreement with the desired stator current values. This operation effectively results in current sources for the stator windings, which allows the current controller to ignore the stator voltages.

At higher speeds, however, where the generator emf approaches the voltage of the DC voltage link, the stator voltages can no longer be ignored. In this operating region, the voltage controller 98 takes the stator voltages into consideration.

The selector 100 senses the rotor speed, $\omega_r$, and selects the voltage controller 98 instead of the current controller 96 when the rotor speed exceeds a predetermined value. This value can be determined empirically by observing the distortion of the current waveform during operation of the current controller at various speeds. In the preferred embodiment, using a four pole squirrel-cage induction generator with a 1800 rpm synchronous speed and operating at a nominal voltage of 750 volts, the switching point is about 1780 rpm. Preferably, some hysteresis is built into the switching point of the selector 100 so that small oscillations of rotor speed about the switching point do not cause repeated switching between current control and voltage control. As an alternative to or in addition to monitoring the rotor speed, the DC link voltage and the generator emf can be monitored to determine at which point to switch between current control and voltage control. Monitoring the DC link voltage is not necessary in the preferred embodiment because the voltage is maintained at a fairly constant value.

Like the current controller 96, the voltage controller 98 periodically generates a set of PWM commutation signals for switching on and off the active switches of the rectifier. The voltage controller monitors the desired and actual torque and flux, as defined by the field oriented currents, $i_{sd}^*$ and $i_{sq}^*$, compensates for the stator voltages, and generates field oriented control voltages, $v_{sd}^*$ and $v_{sq}^*$, which are used to generate the commutation signals.

The stator voltages, in field coordinates, are defined by the following equations:

$$\frac{\sigma L_s \dot{i}_{sd}}{R_s} + i_{sd} = \frac{v_{sd}}{R_s} - \frac{(1-\sigma) L_s \lambda_r}{R_s L_0} + \frac{\sigma L_s \omega_s i_{sq}}{R_s} \quad (28)$$

$$\frac{\sigma L_s \dot{i}_{sq}}{R_s} + i_{sq} = \frac{v_{sq}}{R_s} - \frac{(1-\sigma) L_s \omega_r \lambda_r}{R_s L_0} - \frac{\sigma L_s \omega_s i_{sd}}{R_s} \quad (29)$$

where:
$\sigma$ = total or global leakage factor;
$L_s$ = stator inductance
$R_s$ = stator resistance.

The last two terms on the right sides of equations (28) and (29) are coupling terms for which compensation is required to eliminate cross coupling between the direct and quadrature axes. The goal is to generate $v_{sd}^*$ as a function of $i_{sd}^*$ and $v_{sq}^*$ as a function of $i_{sq}^*$. Eliminating the cross coupling terms allows $v_{sd}^*$ to control rotor flux and $v_{sq}^*$ to control torque.

Figure 11:
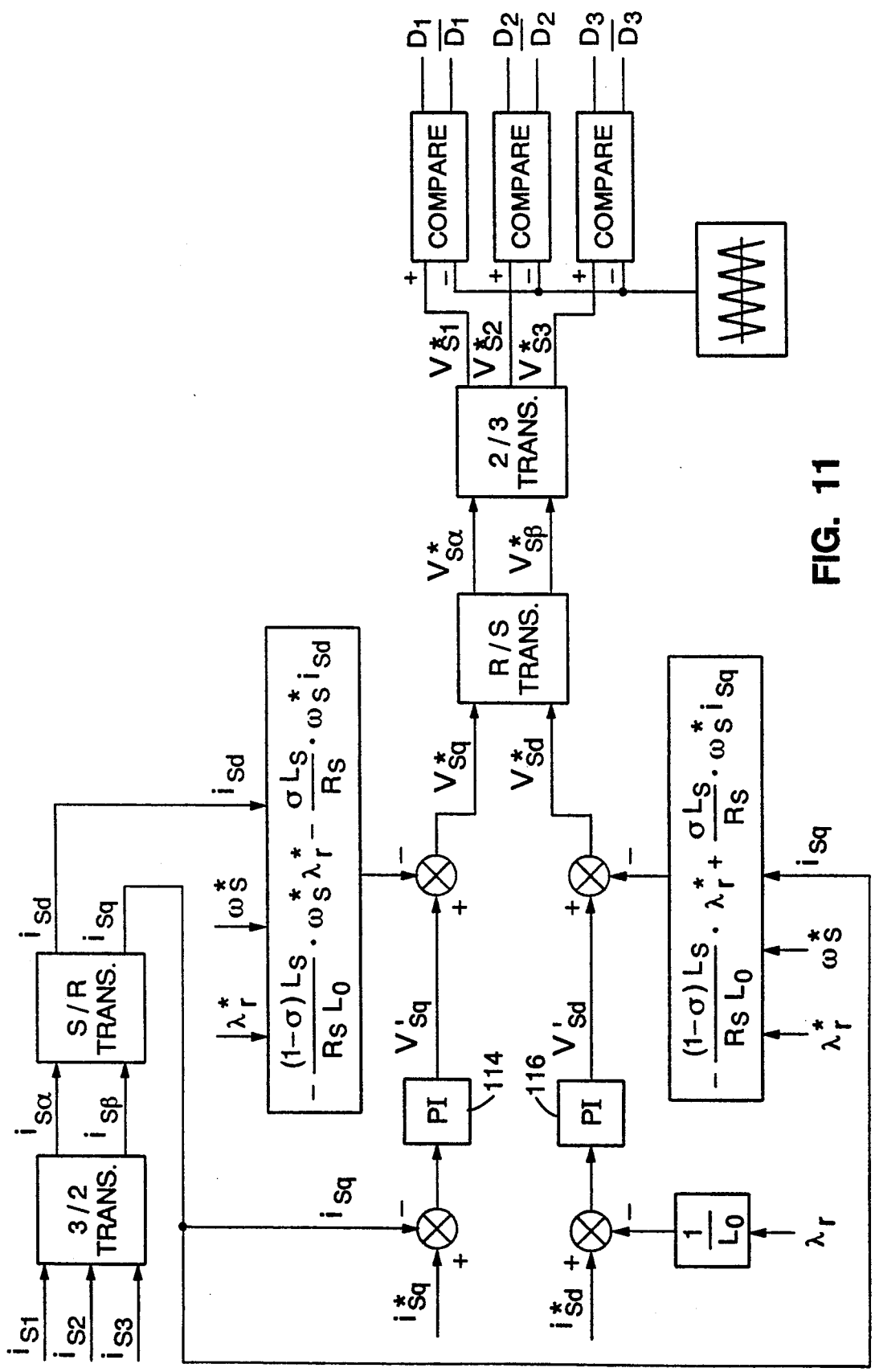
FIG. 11 is a block diagram of a voltage controller of the present invention.

The operation of the voltage controller 98 is shown in FIG. 11. The actual 3-phase stator currents, $i_{s1}, i_{s2}, i_{s3}$, are converted into field oriented coordinates by equations (1) and (2). The desired voltage on the quadrature axis, $v_{sq}^*$, is generated by first subtracting the actual quadrature current, $i_{sq}$, from the desired quadrature current, $i_{sq}^*$, and then running the resultant through a proportional-integral (PI) controller 114 to generate $v_{sq}'$, which is a measure of a quadrature axis current error. The PI controller supplies a proportional/integral output of the form:

$$v_{sq}' = k_p(i_{sq}^* - i_{sq}) + k_i \int (i_{sq}^* - i_{sq}) dt \qquad (30)$$

where $k_p$ and $k_i$ are coefficients selected to provide adequate stability. Equation (30) can be evaluated in discrete time by the following:

$$V_{sq}'(k) = V_{sq}'(k-1) + (k_p + \Delta t k_i)(i_{sq}^*(k) - i_{sq}(k)) - k_p(i_{sq}^*(k-1) - i_{sq}(k-1)) \qquad (31)$$

The value of $v_{sq}'$ is then compensated by adding a decoupling factor consisting of the two voltage coupling terms on the right side of equation (29), which results in $v_{sq}^*$ as follows:

$$v_{sq}^* = v_{sq}' + \frac{(1-\sigma) L_s \omega_s^* \lambda_r^*}{R_s L_o} + \frac{\sigma L_s \omega_s^* i_{sd}}{R_s} \qquad (32)$$

Similarly, the desired voltage on the direct axis, $v_{sd}^*$, is generated by first subtracting the rotor flux divided by the mutual inductance, $\lambda_r^*/L_o$, from desired direct axis current, $i_{sd}^*$. The resultant is then input to another PI controller 116, which generates $v_{sd}'$ as a measurement of direct axis current error. PI controller 116 is similar to the PI controller 114 for the quadrature component. The value of $v_{sd}'$ is then compensated by adding a decoupling terms on the right side of equation (28), which results in $v_{sd}^*$ as follows:

$$v_{sd}^* = v_{sd}' + \frac{(1-\sigma) L_s \dot{\lambda}_r^*}{R_s L_o} - \frac{\sigma L_s \omega_s^* i_{sq}}{R_s} \qquad (33)$$

Once the desired field coordinate voltages, $v_{sd}^*$ and $v_{sq}^*$, have been generated, they are transformed into 3-phase stator voltages by equations (3) and (4), resulting in $v_{s1}^*$, $v_{s2}^*$, and $v_{s3}^*$. These reference voltages are modulated by a triangular carrier wave to generate the PWM commutation signals, $D_1$, $\overline{D}_1$, $D_2$, $\overline{D}_2$, $D_3$, and $\overline{D}_3$ that are sent to the selector 100 (FIG. 5). In the preferred embodiment, the triangular carrier wave has a frequency of about 8 kHz, while the comparisons between the reference voltages and the carrier wave are performed continuously or at a rate much higher than 8 kHz.

Figure 12:
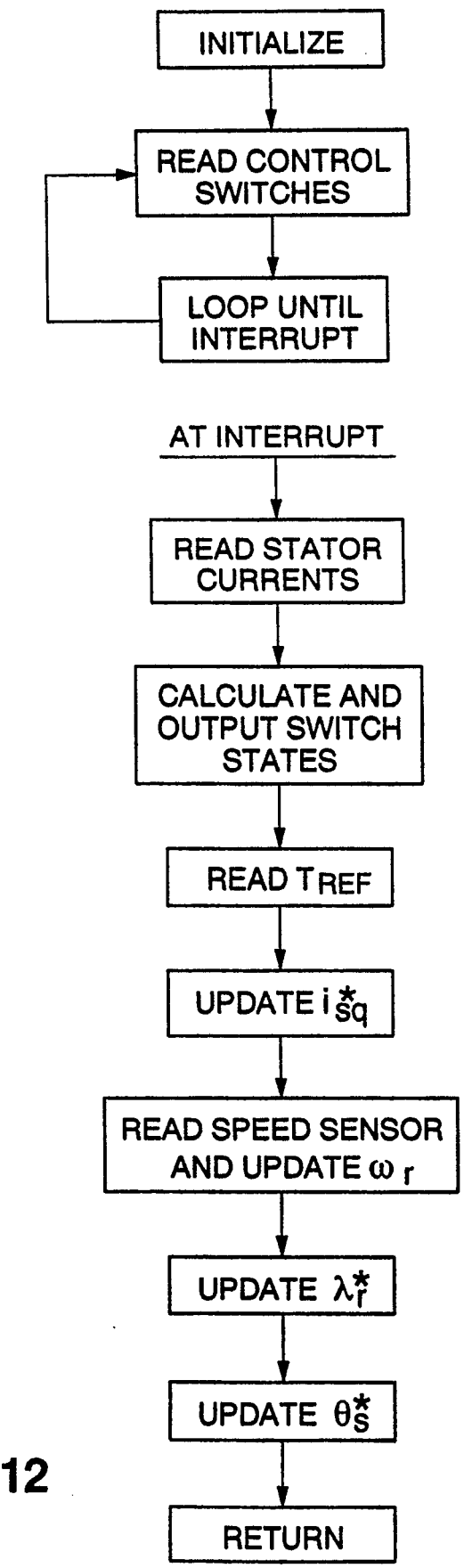
FIG. 12 is a block diagram of a computer program used in the generator control unit of the present invention.

FIG. 12 illustrates how a computer program is structured for execution in the digital signal processor of the generator control unit. The program consists primarily of a main loop and an interrupt service routine. The main loop initializes the necessary variables, and then loops until it is interrupted, which occurs periodically, at about 8 kHz in the preferred embodiment. The interrupt service routine performs the calculations necessary for generating the PWM commutation signals, and then updates the control variables. Upon interrupt, the interrupt service routine first reads the stator currents, and then executes the code of either the current controller or the voltage controller to generate and output the appropriate switch states. The interrupt routine then reads a value for the torque reference, $T_{ref}$, and updates the corresponding value of the desired quadrature axis current, $i_{sq}^*$. The routine then reads the speed sensor and computes a new value for the rotor speed $\omega_r$. The routine updates the value for desired rotor flux $\lambda_r^*$ and the desired instantaneous rotor flux angle $\theta_s^*$. The interrupt routine then returns to the main loop, which waits until the next periodic interrupt, at which time the updated values will be used to compute the switch states. All constants used in the calculations are computed in advance, and the expressions are arranged to avoid division which executes relatively slowly in a DSP. The steps performed in the computer program can be executed in different order than is shown in FIG. 12, but it is important to calculate and output the switch states as soon as possible after reading the actual stator currents.

Figure 13:
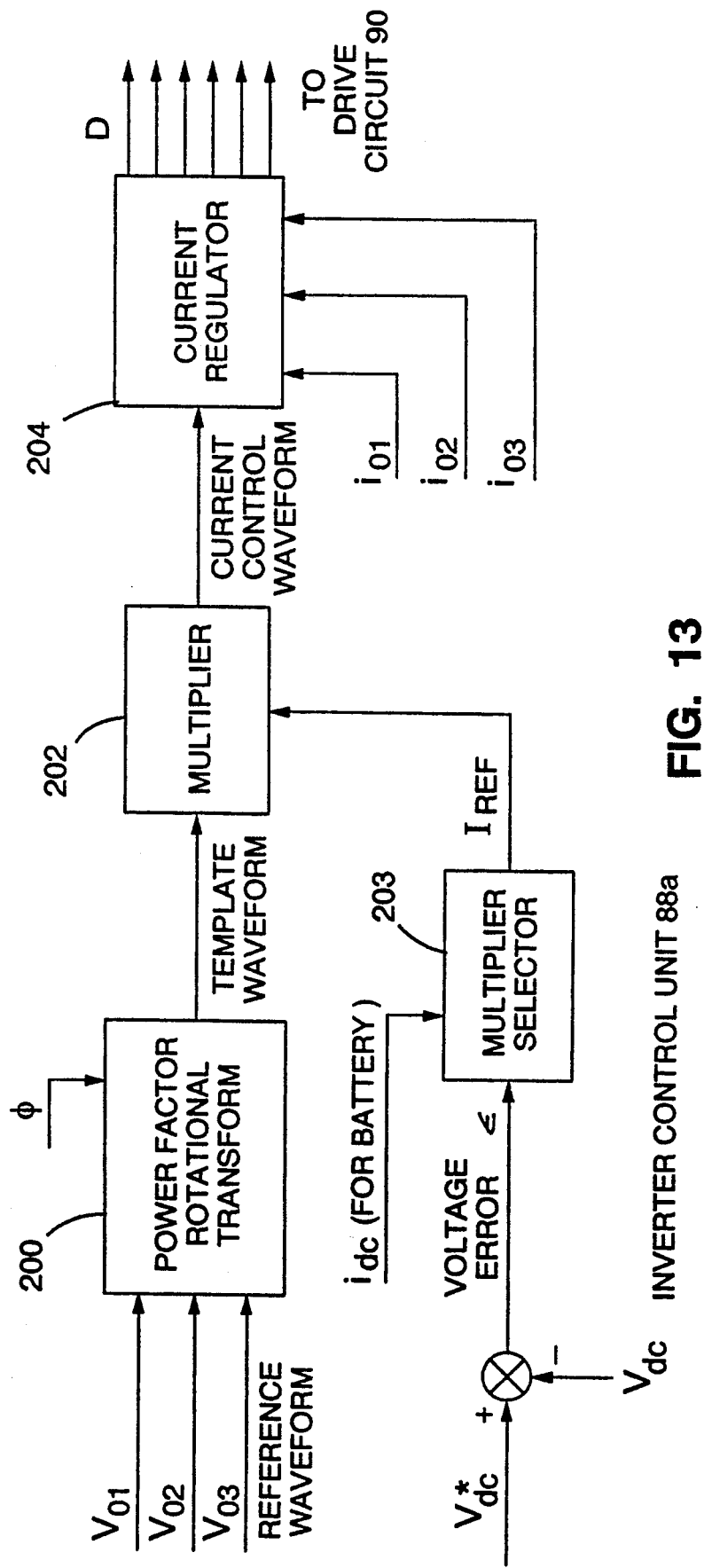
FIG. 13 is a block diagram of an inverter control unit of the present invention.
Figure 14:
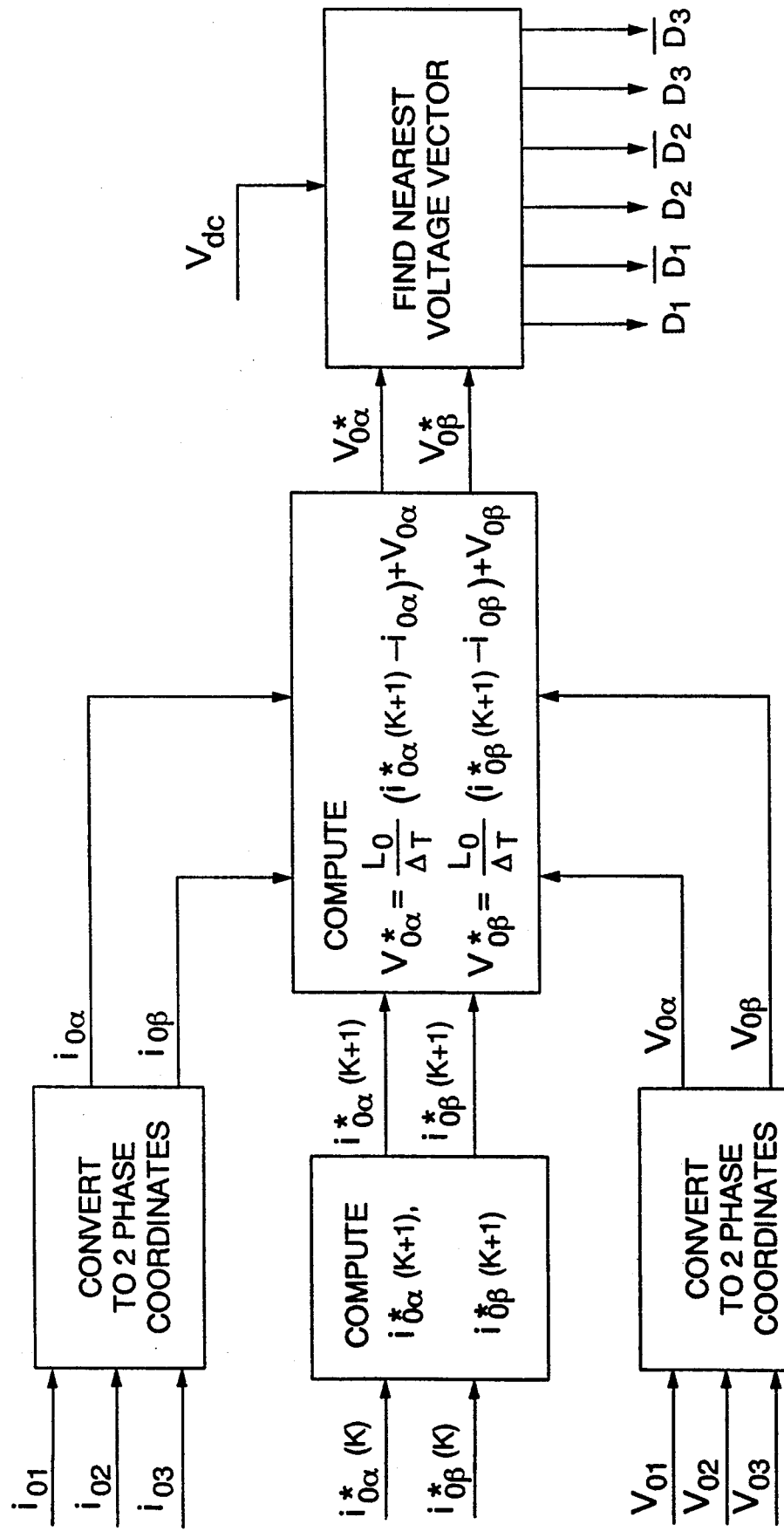
FIG. 14 is a block diagram of a current controller used in the inverter control unit of FIG. 13.
Figure 15:
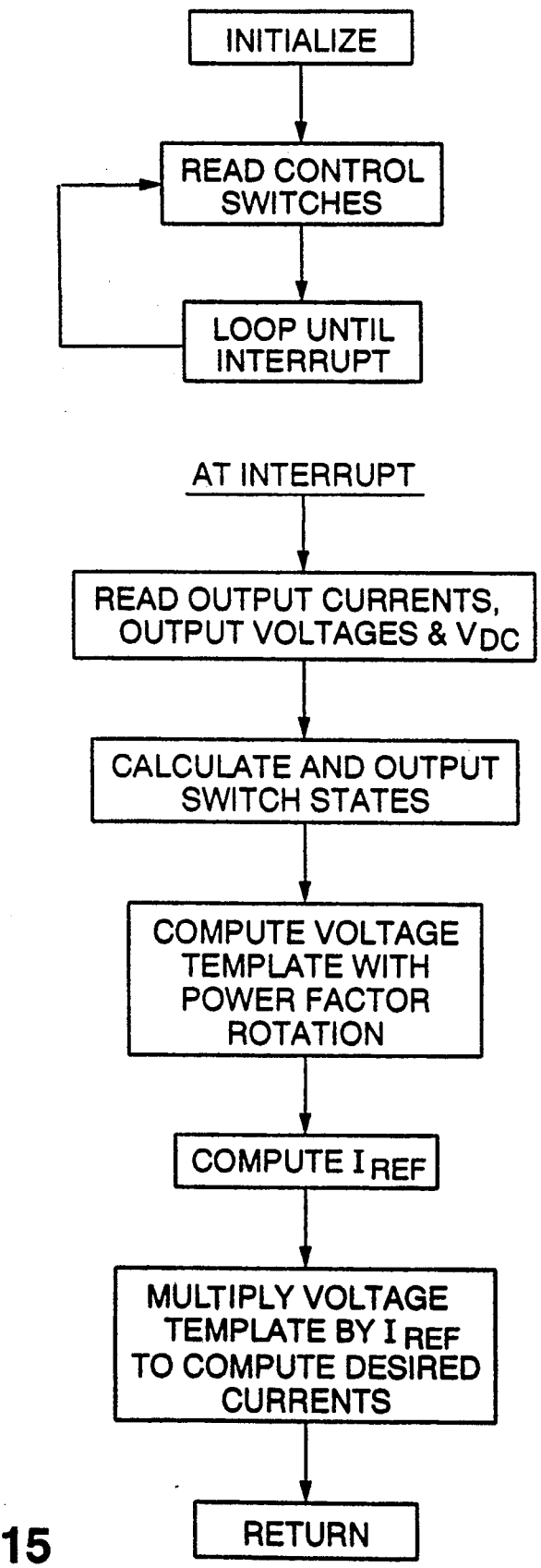
FIG. 15 is a block diagram of a computer program used in the inverter control unit of the present invention.

Turning now to the inverter side of the wind turbine system, the details of the inverter control unit 88 are shown in FIGS. 13-15. Like the generator control unit 76, the inverter control unit is preferably implemented with a digital signal processor, a Texas Instruments model TMS320C25. Computer code for implementing the inverter control function in a DSP is disclosed in the microfiche appendix.

Referring briefly to FIG. 2, the inverter control unit 88, through the drive circuit 90, controls the inverter switch matrix to supply power to the utility grid with low THD. The inverter 28 can be controlled by the control unit 88 to supply or absorb reactive power as needed by adjusting the current flowing through each of the active switching devices 82. Low harmonic distortion can be achieved in the same way as in the current controller of the generator control unit, by periodically minimizing a distortion index. In addition, the inverter control unit 88 can also control the voltage of the DC voltage link 24, to maintain it at a desired value. Different embodiments of the inverter control unit 88 are disclosed herein. For illustrative purposes, two embodiments are designated inverter control units 88a and 88b. Which of these inverter control units 88a, or 88b is the preferred embodiment is application specific: the inverter control unit 88a disclosed in FIG. 13 is suitable for supplying an selectable power factor output, and the inverter control unit 88b is better suited for operation in a static VAR mode than the inverter control unit 88a. In each, a multiplier controller can be implemented either for charging and discharging the energy source 25, or for maintaining a constant voltage across the DC voltage link 24.

As shown in FIG. 13, the inverter control unit 88a senses the output voltage as a sinusoidal reference waveform $v_{o1}$, $v_{o2}$, $v_{o3}$ for each phase. The reference waveforms are rotated by a certain phase angle $\phi$, as illustrated in a box 200, to generate a rotated reference waveform, or a "template" waveform for each phase. As illustrated in a box 202, the template waveforms are multiplied by a factor, $I_{ref}$, to generate a current control waveform for each phase. Calculation of the multiplication factor, illustrated in a box 203, is described subsequently with respect to FIGS. 19 and 20. In the current regulator 204, the actual currents $i_{o1}$, $i_{o2}$, $i_{o3}$ are compared to the current control waveform to generate the PWM commutation signals for the inverter switches. All of the calculations of the inverter control unit 88 are performed periodically. In the preferred embodiment, the DSP cycles through its calculations every 125 microseconds, equal to a rate of 8 kHz.

The rotational transformation of the reference waveform can be accomplished in either 3-phase or 2-phase coordinates. The reference waveform can be transformed into 2-phase coordinates using equation (1) and rotated straightforwardly by the angle $\phi$. In 3-phase coordinates, the template waveform, rotated by an angle $\phi$, is calculated as follows:

$$v_{t1} = (\cos \phi + \sqrt{3}/3 \sin \phi) v_{o1} + (2\sqrt{3}/3 \sin \phi) v_{o2} \quad (34)$$

$$v_{t2} = (\cos(\phi + 2\pi/3) + \sqrt{3}/3 \sin(\phi + 2\pi/3)) v_{o1} + (2\sqrt{3}/3 \sin(\phi + 2\pi/3)) v_{o2} \quad (35)$$

$$v_{t3} = -v_{t1} - v_{t2} \quad (36)$$

These values can be transformed into the 2-phase $\alpha,\beta$ coordinate system using equation (1). The result is $v_{t\alpha}$ and $v_{t\beta}$. The template values that result from the rotational transformation, $v_{t\alpha}$ and $v_{t\beta}$, are then multiplied by the value of $I_{ref}$ to generate the desired 2-phase output currents, $i_{o\alpha}*$ and $i_{o\beta}*$. The desired output currents are input into the current regulator 204, which compares them to the actual currents and generates the appropriate PWM commutation signals for the inverter switches.

The current regulator 204 of the inverter control unit 88 can be implemented in the several ways described above for the current controller 96 of the generator control unit, including the delta modulator. In one embodiment, the current regulator 204 generates switch states that minimize the distortion index, J, in a manner similar to that described above with respect to FIGS. 9 and 10. Referring to FIG. 14, this embodiment of the inverter current controller generates desired output voltages, $v_{o\alpha}*$ and $v_{o\beta}*$, according to the following equations:

$$v_{o\alpha}*(k) = \frac{L_o(i_{o\alpha}*(k+1) - i_{o\alpha}(k))}{\Delta t} + v_{o\alpha}(k) \quad (37)$$

$$v_{o\beta}*(k) = \frac{L_o(i_{o\beta}*(k+1) - i_{o\beta}(k))}{\Delta t} + v_{o\beta}(k) \quad (38)$$

where:
$L_o$ is the output impedance;
$i_{o\alpha}*(k+1)$ and $i_{o\beta}*(k+1)$ are the desired output currents at time=$k+1$ in $\alpha,\beta$ coordinates;
$i_{o\alpha}$ and $i_{o\beta}$ are the measured output currents in $\alpha,\beta$ coordinates;
$v_{o\alpha}$ and $v_{o\beta}$ are the measured output voltages in $\alpha,\beta$ coordinates; and
$\Delta t$ is the sample period.

The desired output voltages, $v_{o\alpha}*$ and $v_{o\beta}*$, are then compared to the seven available voltage vectors, and the switch state associated with the nearest voltage vector is selected and output to the inverter switches. Determining the nearest voltage vector is accomplished in the same manner as explained above with respect to the generator current controller of FIGS. 9 and 10.

Reference is made to FIGS. 19 and 20, which disclose alternative embodiments of the multiplier selector 203 that calculates the multiplication factor, $I_{ref}$. Referring first to FIG. 19, a proportional/integral (P/I) multiplier selector 203a is disclosed that maintains a constant voltage on the DC voltage link 24. The P/I multiplier selector 203a is particularly suitable when the energy storage device 25 has relatively small storage capacity, such as the storage of a capacitor rather than that of a battery. The measured DC link voltage, $v_{dc}$, is subtracted from a desired value of the DC link voltage, $v_{dc}*$, to generate an error $\epsilon$, which is then input to the proportional/integral (P/I) multiplier selector 203a that supplies a proportional/integral output of the form:

$$I_{ref} = k_p(v_{dc}* - v_{dc}) + k_i \int (v_{dc}* - v_{dc})dt \quad (39)$$

where $k_p$ and $k_i$ are coefficients selected to provide adequate stability. The constants $k_p$ and $k_i$ can be determined using conventional control techniques, such as the root-locus method, the frequency domain (Bode plot) method, or by empirically testing the device. The values are highly dependent upon the particular embodiment. In discrete time, equation (39) can be evaluated as follows:

$$I_{ref}(k) = I_{ref}(k-1) + (k_p + \Delta t k_i)((v_{dc}*(k) - v_{dc}(k)) - k_p((v_{dc}*(k-1) - v_{dc}(k-1)) \quad (40)$$

When the energy storage device 25 has a larger storage capacity than a capacitor and can act as a voltage source, voltage regulation is not required. In other words, the voltage regulating function is automatically performed by the voltage source, and in that instance the P/I multiplier selector 203a is unnecessary. In that case, the multiplier selector 203 may comprise another arrangement, such as a multiplier $I_{ref}$ selected directly by an operator to output a desired real power amount. For example, the operator could monitor the real power, and adjust the multiplier selector 203 until $I_{ref}$ commands the desired amount of real power is flowing through the inverter 28. Alternately, the multiplier selector 203 could include a circuit that automatically selects $I_{ref}$ to provide an amount of real power flow based on an operator's input of the desired real power flow and feedback indicative of the amount of real power. This simple arrangement for selection of a multiplier $I_{ref}$ is suitable for an energy source such as a fuel cell that maintains a constant voltage. However, for a battery or another energy storage device that stores energy as well as sources energy, the following multiplier selector 203b, to be described with reference to FIG. 20, is more appropriate.

Reference is now made to FIG. 20, which shows a charge/discharge multiplier selector 203b suitable for battery control, i.e., battery charging and discharging. On the average, the battery charge (e.g. 80%) remains approximately constant. In FIG. 20, a current sensor 210 is positioned between the active rectifier 20 and the energy storage device 25 to measure the generator-side current supplied from the generator side to the energy storage device 25. The sensed current $i_{dc}$ is supplied as an input to the charge/discharge multiplier selector 203b.

Another input into the charge/discharge multiplier selector 203b is the voltage $v_{dc}$ across the DC voltage link 24. Within the charge/discharge multiplier selector 203b, the DC link voltage, $v_{dc}$, is multiplied by the sensed current $i_{dc}$, as illustrated in a box 212 within the charge/discharge multiplier selector 203b. This product from the box 212 is then applied to a gain box 214 which multiplies the product by a factor of the following:

$$\frac{1}{\sqrt{3} \times v_{ac} \times \text{the power factor}} \text{ or } \frac{1}{\sqrt{3} \cos\phi \, v_{ac}}$$

where $v_{ac}$ is the rms voltage at the utility grid, measured at its connection with the line side inverter 28.

The output of the box 214, a generated power term, is applied to an adder 215 which adds it to a battery charge term. The added term, the battery charge term, is dependent upon the particular battery and indicates the extent to which the battery needs to be charged or discharged. For example, in a lead-acid battery the amount of charge or discharge can be inferred from a difference between the voltage sensed and the desired voltage, and thus the battery charge term for a lead-acid battery is a function of the difference between the sensed and the desired voltages, i.e., the voltage error. The sum of the above two terms, added in the adder 215, is applied to a low pass filter 216. The output of the low pass filter 216 is applied directly to the multiplier 202 as $I_{ref}$. The low pass filter 216 has a cut-off frequency of tens of Hertz or less, possibly less than 1 Hz. The low pass filter 216 outputs the multiplier value, $I_{ref}$, that is applied to the multiplier 202.

The most rapidly varying input to the charge/discharge multiplier selector 203b is the generator-side current $i_{dc}$. Other inputs, such as $v_{dc}$ and the battery charge term, will fluctuate at a much lower rate. The effect of a low pass filter 216 on the varying generator-side current $i_{dc}$ is to smooth out typical fluctuations that occur with wind variations in normal operations.

Reference is made to FIG. 21, which is a graphical illustration that compares the generator-side power illustrated by a curve 218 with the average line-side output power illustrated by a curve 220, in an embodiment implementing the battery charge multiplier selector 203b shown in FIG. 20. The generator-side power curve 218 fluctuates much more rapidly than the average line-side output power curve 220 which is smoothed by the effect of the low pass filter and multiplier selector 203b. It should be apparent to one skilled in the art that the real power is proportional to voltage*current, and therefore the current sensor 210 provides the value $i_{dc}$ that is proportional to the generator-side power. Using the generator-side current $i_{dc}$, the low-pass filter 216 provides a multiplier value $I_{ref}$ that, when applied by the multiplier 202, substantially smooths the output power. Battery charging occurs when the generator-side power is greater than the line-side power, and conversely, discharging occurs when the generator-side power is less than the line-side power.

A computer program directs the operation of the digital signal processor of the inverter control unit 88a or 88b (to be described with reference to FIGS. 22-24) to perform the calculations described above. As shown in FIG. 15, the computer program is structured like that of the generator control unit in that a main loop executes until periodically interrupted, and then an interrupt service routine updates the sensed inputs, PWM switch state, and calculated variables. The interrupt service routine running on the inverter control unit DSP first reads the output currents, output voltages and DC link voltage. Then it calculates the optimal switch state, which it outputs to the inverter switches. Then the interrupt routine performs calculations necessary for the next calculation of switch state by rotating the voltage reference to define the template waveform, computing the multiplication factor $I_{ref}$, and multiplying the template waveform by $I_{ref}$ to compute the desired currents for the next interrupt. Then control passes to the main loop, where it waits until interrupted again. In the preferred embodiment, interruptions occur at a rate of about 8 kHz.

Referring back to FIG. 2, the power controller 54 can control the magnitude of reactive power to supply VARs (volt-ampere-reactive) to the utility either when operating, or in a static VAR mode while not operating. If the power factor angle $\phi$ is controlled, the power controller 54 outputs to the inverter control unit 88 a constant value for $\phi$. In an alternate embodiment to be described with reference to FIGS. 22-24, the power controller 54 can control either the power factor angle $\phi$ or directly control real power and reactive power levels. The type of power factor control can be specified by the operation mode signal that is input into the power controller.

The reactive power can also be controlled to some extent by monitoring the reactive power feedback signal $Q_{fb}$, comparing it to a desired reactive power level defined by the reactive power input signal, and adjusting the power factor angle $\phi$, to obtain the desired reactive power. However, as the power factor angle $\phi$ gets increasingly closer to 90°, control becomes difficult. At angles very close to 90°, control is lost.

The inverter control unit 88a of FIG. 13, although it can output a constant power factor angle, is limited by the relationship between the real and the reactive power specified by the power factor angle $\phi$. Particularly, the real power, in watts, and the reactive power, in VARs, cannot be controlled independently and directly with the previously described arrangement. Instead, the relationship specified by the angle $\phi$ must maintained.

In order to maintain an approximately constant number of VARs in changing real power conditions, feedback may be utilized with the inverter control unit 88a disclosed in FIG. 13. In other words, the voltage, current, and real power could be measured with feedback, and the power factor angle continually adjusted to maintain the desired number of VARs. However, adjustment of the power factor angle changes the amount of real power that must be dissipated, possibly in very appreciable amounts. Dissipating large amounts of real power has disadvantages, for example the cost of additional equipment and wasted electrical energy.

Figure 22:
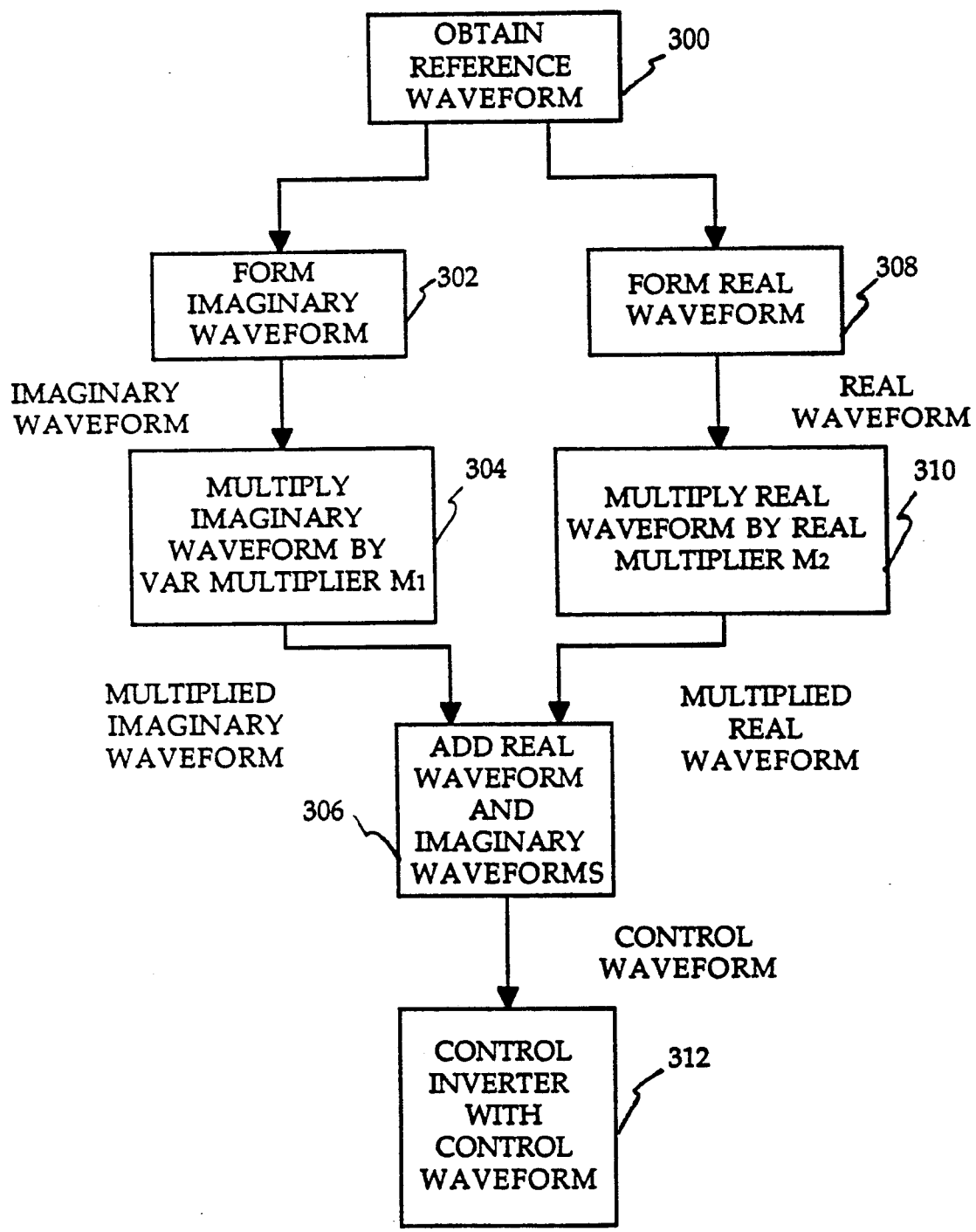
FIG. 22 is a flowchart illustrating operation of the second inverter control unit.
Figure 23:
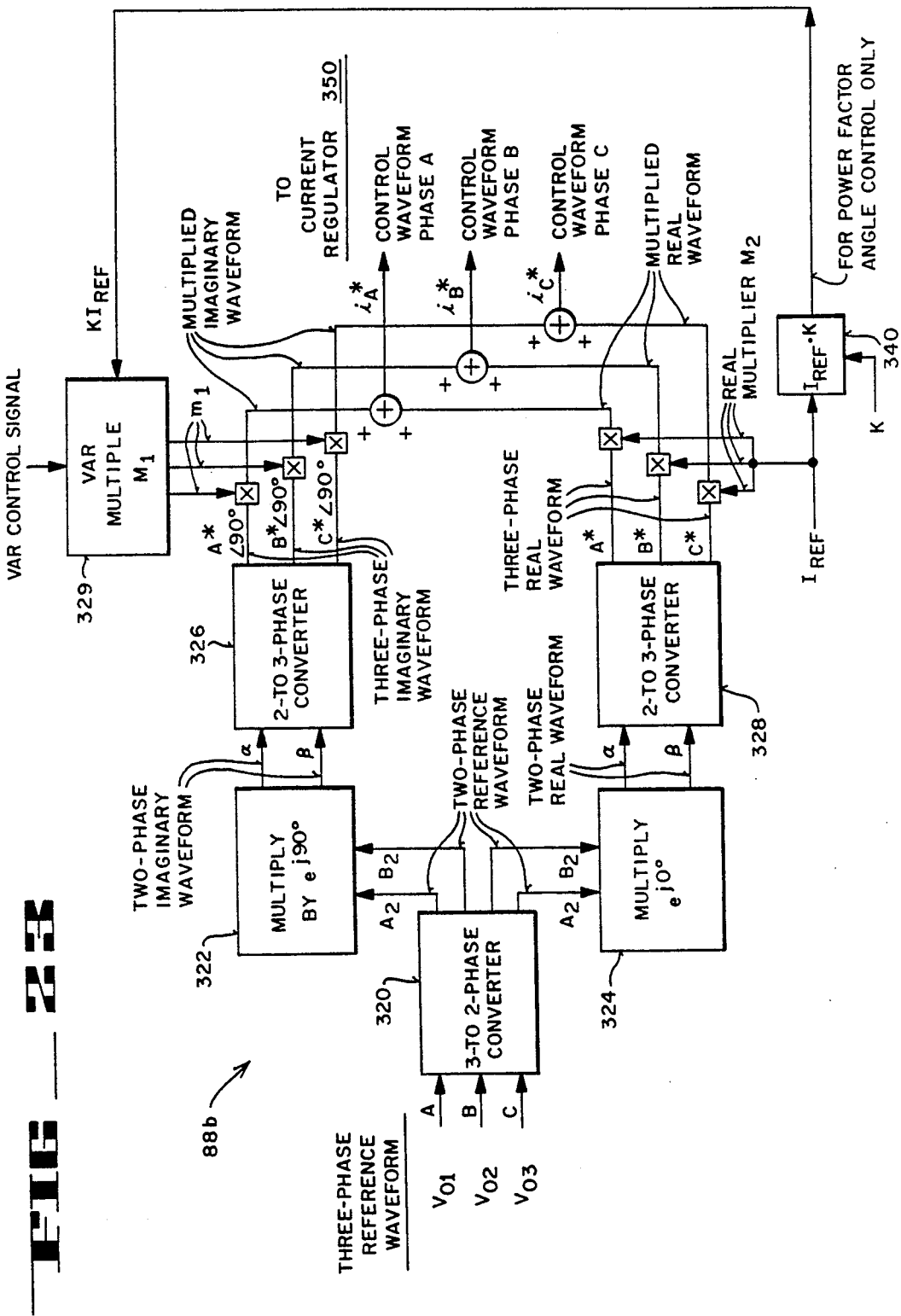
Figure 24:
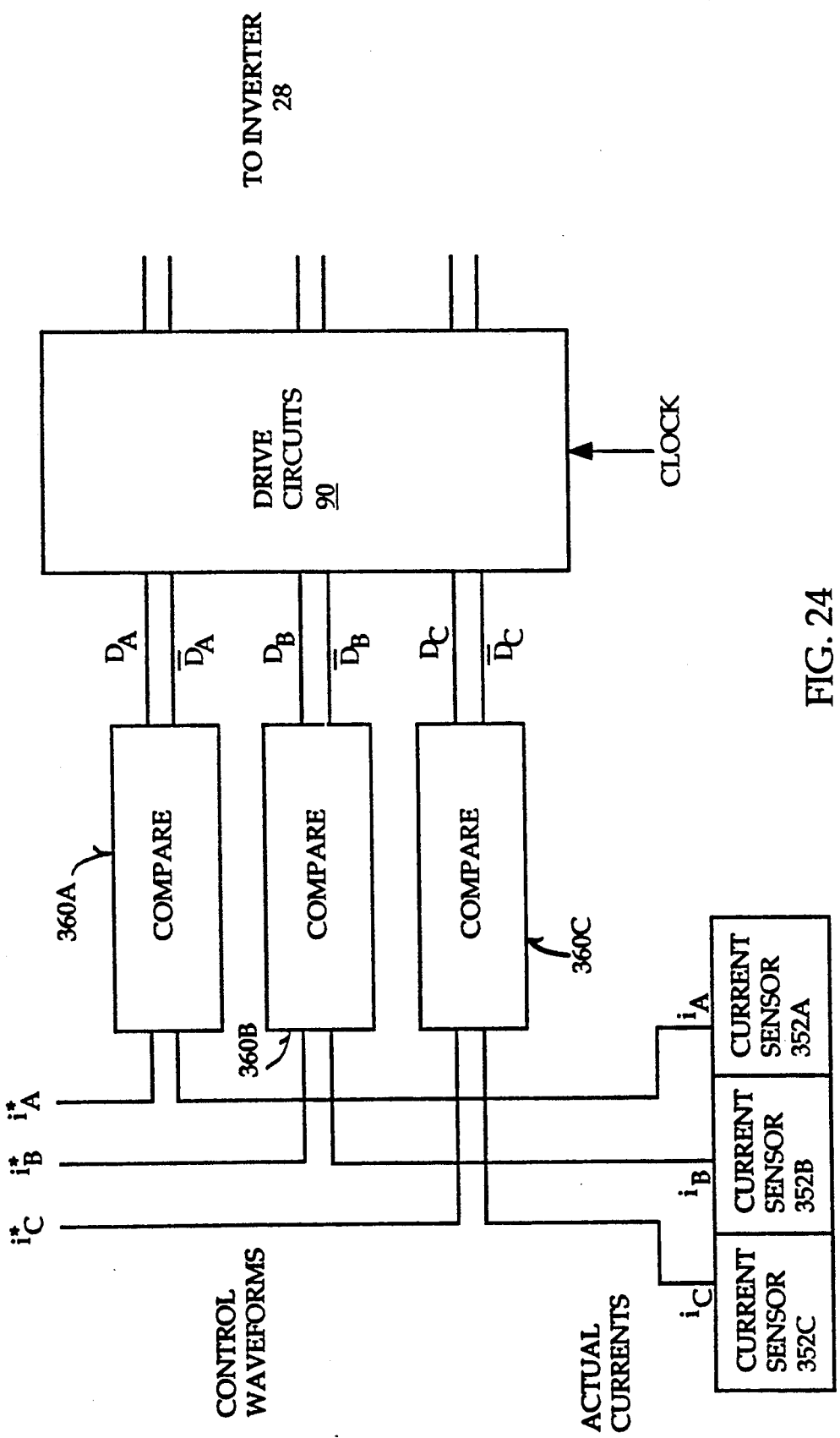
FIG. 24 is a block diagram of a delta modulator current controller for controlling inverter currents in accordance with the current control waveform.

Reference is made to FIGS. 22, 23, and 24, which illustrate the structure and method and operation of an inverter control unit 88b. The inputs to the inverter control unit 88b are provided, as illustrated in FIG. 2, through the power controller 54. The inputs to the inverter control unit 88 include the voltage sensed across the voltage link 24, $v_{dc}$, a reactive power signal, a power factor, which may be termed K (if appropriate) and an optional operation mode to select any of a number of operational modes. Particularly the operational mode for the inverter control unit 88b may be able to select between a mode in which a number of VARs can be selected independently of the real power, and an alternate mode in which the power factor angle is selected. The inputs to the inverter control unit 88b include the 3-phase reference signals signified by $v_{o1}$, which produces the phase A reference waveform, $v_{o2}$ which provides a phase B reference waveform, and $v_{o3}$ which provides a phase C reference waveform. As described previously, the voltage, used as a reference for each of the phase is provided by transformation to a low voltage level by voltage transformers 92 (FIG. 2). Using the above inputs a control waveform for each phase is generated by the inverter control unit 88b in accordance with the algorithm to be described with reference to FIGS. 22, 23, and 24 below. Specifically, the output of the inverter control unit 88a outputs control waveforms for three phases: a phase A control waveform, a phase B control waveform, and a phase C control waveform. Each of these phase control waveforms controls a specific switch pair coupled to a particular output. For example, in FIG. 2, the phase A control waveform may control the switch pairs 82 on the output line 84, the phase B control waveform may control the switch pairs 82 on the output line 85, and the phase C control waveform may control the switch 82 on the output line 86.

Reference is made to FIG. 22, which is a flowchart illustrating operation of the inverter control unit 88b. Preferably, the steps in the flowchart are performed by digital equipment and software, however any other hardware or method may be used to accomplish the following steps. In the preferred embodiment, the control waveform is produced digitally at a rate between 8 kHz and 16 kHz, which means that the sample period for the control waveform is between 125 or 62.5 microseconds, depending upon the selected frequency.

In a box 300, the reference waveform is obtained. For purposes of clarity and explanation, FIG. 22 shows only the operations on a single phase. Based on the description herein, it should be apparent to one skilled in the art that the operations in FIG. 22 occur in parallel for each phase. After the reference waveform has been obtained in the box 300, the reference waveform is split two ways. In one, the reference waveform is applied to form an imaginary waveform as illustrated in a box 302. As will be described in more detail, the imaginary waveform may be obtained by rotating the reference waveform by 90°. The imaginary waveform is then applied, as illustrated in a box 304, to a multiplier $M_1$ which is calculated as will be described below with reference to FIG. 23. The multiplied imaginary waveform is then added in a box 306 to the multiplied real waveform described below.

On the other side of the flowchart, the reference waveform is applied to form the real waveform as illustrated in a box 308. The real waveform may be substantially similar to the reference waveform. The real waveform is applied to a box 310, in which it is multiplied by a real multiplier $M_2$. The multiplied real waveform is then added to the multiplied imaginary waveform to obtain a control waveform. Applying the control waveform, as illustrated in a box 312, the inverter 28 is controlled with the control waveform in order to provide a current in accordance with the control waveform.

Reference is made to FIG. 23 which is a more detailed illustration of the inverter control unit 88b. Beginning from the left in FIG. 25, the 3-phase reference waveform is applied to a 3- to 2-phase converter 220.

The 3- to 2-phase converter 220 converts the three phases of the reference waveform to two phases in accordance with the following matrix equation:

$$\begin{bmatrix} A_2 \\ B_2 \\ 0 \end{bmatrix} = \begin{bmatrix} 1 & \cos(2\pi/3) & \cos(4\pi/3) \\ 0 & \sin(2\pi/3) & \sin(4\pi/3) \\ 1 & 1 & 1 \end{bmatrix} \begin{bmatrix} A \\ B \\ C \end{bmatrix} \quad (41)$$

where $A_2$, $B_2$ are the 2-phase reference quantities and A, B, and C are the 3-phase reference quantities.

The outputs of the 3- to 2-phase converter 320, i.e. the two 2-phase reference waveforms, are provided to two separate processing lines, one of which produces and processes an imaginary waveform and one of which produces and processes a real waveform. Specifically, the 2-phase reference waveform is applied to a box 322 in which each phase is multiplied by $e^{j90°}$. Similarly, the 2-phase reference waveform is applied to a box 324 in which each phase is multiplied by $e^{j0°}$ (or 1). In alternate embodiments, multiplication by 1 may be unnecessary, and the reference waveform may be used directly to form the real waveform at the output of the box 328 without the need for 3- to 2-phase conversion and 2- to 3-phase conversion.

The output of the box 322, a 2-phase imaginary waveform, is then applied to a 2- to 3-phase converter 326 which outputs a 3-phase imaginary waveform. The 2- to 3-phase conversion is accomplished by inverting equation (41):

$$\begin{bmatrix} A^* \\ B^* \\ C^* \end{bmatrix} = \begin{bmatrix} 2/3 & 0 & 1/3 \\ -1/3 & 1/\sqrt{3} & 1/3 \\ -1/3 & 1/\sqrt{3} & 1/3 \end{bmatrix} \begin{bmatrix} A_2 \\ B_2 \\ 0 \end{bmatrix} \quad (42)$$

Similarly, the output of a box 324, a 2-phase real waveform, is applied to a 2- to 3-phase converter 328 to output a 3-phase real waveform.

Each phase of the 3-phase imaginary waveform is then multiplied by a VAR multiplier $M_1$ selected as illustrated in a box 329. The VAR multiplier $M_1$ has the same value for each phase. In the box 329, the VAR multiplier $M_1$ is selected to be either the VAR control signal or the product $KI_{ref}$ to be described below. The VAR control signal can be manually selected by an operator who is observing the number of VARs output and who adjusts the multiplier $M_1$ accordingly, to produce the desired number of VARs. The VAR control signal can also be selected automatically by a hierarchical control loop such as a voltage regulator that can be operator controlled to provide a fixed number of VARs. Alternately, as described below, the VAR multiplier $M_1$ may be selected to provide a constant power factor angle. To precisely control the number of VARs, the reactive power output may be monitored. When a multiple number of static var compensators are in operation, for example at a site having numerous wind turbines whose electrical power is collected at central collection centers, measurement is readily performed at the collection centers. Such a site is discussed below with reference to FIG. 25. In other embodiments, the VARs can be measured by sensors positioned elsewhere on the line connected to the VAR compensator.

The 3-phase real waveform output from the 2- to 3-phase converter 328 is multiplied by a real multiplier $M_2$. The multiplier $M_2$ is preferably the same multiplier for each of the 3-phase lines. The multiplier $M_2$ is calculated in a manner consistent with calculation of $I_{ref}$, described with above reference to FIGS. 19 and 20.

If, instead of controlling the number of VARs, control of the power factor angle is desired, then a value K is selected to specify a predetermined power factor angle. Then, the value K is multiplied by $I_{ref}$, as illustrated in a box 340. This product is applied to the VAR multiplier box 329 which then selects this product to be the VAR multiplier $M_1$. Thus, if the power factor angle is to be controlled, then the imaginary multiplier $M_1$ is proportional to the real multiplier $M_2$.

The results of the multiplication of the real waveforms and the imaginary waveforms are added to obtain the control waveforms for each phase. Specifically, the multiplied real waveform for phase A is added to the multiplied imaginary waveform for phase A in order to obtain the control waveform for phase A. Similarly for phase B and phase C, the multiplied real waveform is added to the multiplied imaginary waveform to yield a control waveform. The control waveforms for each phase are then applied to a current regulator 350 shown in FIG. 24, which controls the inverter 28 through the drive circuit 90 (FIG. 2).

The static VAR compensator described above with reference to FIGS. 22, 23, and 24 can provide a fixed number of VARs to compensate for reactive loads. For example, if the power company were experiencing a lagging current, then the static VAR compensator in each wind turbine could be adjusted to provide the VARs for a leading current. The effect of combining the leading current with the lagging current is to cause the current and voltage to be in phase.

One simple method of current regulation is illustrated in FIG. 24, a delta modulator current regulator 350 which applies the 3-phase line currents $i_A^*$, $i_B^*$, $i_C^*$ specified by the control waveform. The delta modulator current regulator 350 periodically compares each desired line current $i_A^*$, $i_B^*$, $i_C^*$, with the corresponding actual line current $i_A$, $i_B$, $i_C$, sensed by sensors 352 positioned to sense the line currents from each of the switch pair 82 (FIG. 2). The current comparison is accomplished using a compare device 360 for each of the lines. In the preferred embodiment, the comparisons are performed at a rate between 8 and 16 kHz, which is equivalent to a sample period between 125 or 62.5 microseconds. For each sample period, if the desired line current for a phase is greater than the actual line current, then the upper switching device is switched on and the lower switching device switched off, otherwise, the upper device is switched off and the lower device is switched on. The compare devices 360 select PWM (Pulse Width Modulation) commutation signals, $D_A$, $\overline{D}_A$, $D_B$, $\overline{D}_B$, $D_C$, and $\overline{D}_C$ that are applied to the drive circuits 90 to accomplish the desired switching. The drive circuits 90 preferably include conventional transistors and additional circuitry necessary to drive the gates of the respective IGBT switches in response to the on or off signal specified by the PWM commutation signals. For each sample period, a switch state is specified by the PWM commutation signals. The switch state so selected remains in effect until the next sample period, at which time the comparisons are repeated with updated actual and desired values.

Reference is made to FIG. 25, which illustrates a collection of wind turbines 10 that provide power to a central power collection center 400. FIG. 5 is illustrative of a configuration of wind turbines in operation, wherein a multiplicity of wind turbines positioned in a windy area supply their outputs to a central power collection center 400, at which their power is put onto one line and supplied to the utility grid. Generators 401 provide another source of electrical energy for the grid, and may include coal-fired generating plants, oil generators, or nuclear reactors, for example. At the power collection center 400, it is simple and sometimes conventional to provide a reactive power signal such as $Q_{fb}$ indicative of the amount of reactive power in VARs or as a power factor angle. Similarly, it is a simple matter and sometimes conventional to provide a real power signal indicative of the number of watts supplied to the utility grid. These signals, the real power signal and the reactive power signal are useful in providing feedback to the power controller 54 that supplies the inputs to the inverter control unit 88 (FIG. 2). In such a configuration, one or more of the wind turbines 10 may be producing differing amounts of power, for example one wind turbine may be producing twice as much power at any instant of time as another wind turbine. The differences are due to a variety of factors, such as location and windspeed variations due to the location. In the embodiment described previously, where the DC voltage link 24 is connected to a substantial energy storage device 25, the power fluctuations are smooth and a substantially constant power is delivered to the power collection center 400.

Additionally, with a number of wind turbines in the field, it is possible to connect the DC voltage links of two wind turbines together. For example, the wind turbine 10a is connected to a DC energy storage 402, and the wind turbine 10b is also connected to the DC energy storage 402. The centralized common DC energy storage 402 may be advantageous for cost reasons. Specifically, it may be economical to centralize batteries, or fuel cells, or any other energy storage device. Thus, the common DC energy storage 402 would function like the energy storage device 25, and supply a source of constant voltage, or (if the common DC energy device 402 is capable of energy storage) the device can function to collect and store the generated power until it can be delivered to the power collection center 400 through the inverter of each of the wind turbines 10a, 10b.

From the above description, it will be apparent that the invention provides a novel and advantageous variable speed wind turbine. The foregoing discussion discloses and describes merely exemplary methods and embodiments of the present invention. As will be understood by those familiar with the art, the invention may be embodied in other specific forms without departing from the spirit or essential characteristics thereof. For example, some aspects of the current controller can be performed in various ways equivalent to those disclosed herein, including using hysteresis control or forced oscillation with triangular intersection. The generator need not be a three-phase squirrel-cage induction generator, but may be any multiphase generator, including a wound field or permanent magnet synchronous generators or a switched reluctance generator. Certain aspects of the generator control could be performed open-loop, instead of the closed loop control disclosed herein. Also, the power converter could have a DC current link, or could be a cyclo-converter instead of a DC voltage link. In addition, the torque monitor could directly measure torque with a transducer, instead of inferring torque from the measured stator currents. Accordingly, the disclosure of the present invention is intended to be illustrative, but not limiting, of the scope of the invention, which is set forth in the following claims.

What is claimed is:

1. A variable speed wind turbine that generates electrical power that varies dependent upon a fluctuating wind speed, comprising:
   a turbine rotor including at least one blade mounted to a rotatable shaft;
   a multiphase generator having a stator and a rotor coupled to said rotatable shaft for rotation therewith, said generator providing electrical power with a varying frequency;

a power converter for converting said varying frequency electrical power into constant frequency electrical power, said power converter including a DC voltage link; and an electrical energy source connected to the DC voltage link, said electrical energy source capable of supplying sufficient energy to smooth constant frequency power fluctuations during wind speed fluctuations.

2. The variable speed wind turbine of claim 1 wherein the electrical energy source includes a fuel cell.

3. The variable speed wind turbine of claim 1 wherein the power converter comprises a pair of active switches for each phase of the generator, said wind turbine further comprising a generator controller means coupled to the power converter for controlling the active switches including field orientation means for defining a desired quadrature axis current in field coordinates, and switch control means for controlling the active switches to produce stator electrical quantities that correspond to the desired quadrature axis current.

4. The variable speed wind turbine of claim 1, wherein the power converter further comprises:

a rectifier including a pair of active switches for each phase of the generator coupled between the DC voltage link and a stator power tap and operable for switching stator currents therebetween; and an inverter including a pair of active switches for each phase of output power coupled between the DC voltage link and an output tap and operable for switching inverter currents therebetween.

5. The variable speed wind turbine of claim 1 wherein the electrical energy source includes a means for storing energy generated in the multiphase generator.

6. The variable speed wind turbine of claim 5 further comprising means for controlling the charge/discharge ratio of the electrical energy source.

7. The variable speed wind turbine of claim 5 wherein the electrical energy source includes a battery having energy storage within the range of 200 Kw-min to 4000 Kw-min.

8. The variable speed wind turbine of claim 5 wherein the electrical energy source includes a superconducting magnet.

9. The variable speed wind turbine of claim 1, wherein the power converter further comprises:

a rectifier including a pair of active switches for each phase of the generator coupled between the DC voltage link and a stator power tap and operable for switching stator currents therebetween.

10. The variable speed wind turbine of claim 9 further comprising a generator controller means coupled to the rectifier for controlling the active switches, including field orientation means for defining a desired quadrature axis current in field coordinates, and switch control means for controlling the active switches to produce stator electrical quantities that correspond to the desired quadrature axis current.

11. A wind turbine as recited in claim 10 wherein said power converter comprises means for controlling stator currents for each phase of the generator, and wherein the switch control means includes means for controlling the active switches to produce stator currents that correspond to the desired quadrature axis current.

12. The wind turbine as recited in claim 10 wherein the stator electrical quantities are stator voltages, and wherein the switch control means includes means for controlling the active switches to produce stator voltages that correspond to the desired quadrature axis current.

13. The wind turbine as recited in claim 10 further comprising stator current sensors operable for sensing stator currents and a torque monitor operable for determining a measure of generator torque, wherein the torque monitor includes means for converting the sensed stator currents into field coordinates and then converting into a sensed torque value.

14. A wind turbine as recited in claim 10 wherein the generator controller means includes a digital signal processor that periodically receives a torque reference signal indicative of desired generator torque and a rotor speed signal indicative of the rotational speed of the generator, computes the desired quadrature axis current and converts it into stator coordinates, and determines pulse width modulation signals for switching the active switches to produce stator electrical quantities that correspond to the desired quadrature axis current.

15. The wind turbine as recited in claim 10 further comprising rotor speed sensor means for defining a rotor speed signal indicative of the rotational speed of the generator rotor, wherein the power converter establishes a flux field in the generator rotor that rotates at a slip speed with respect to the rotor, and wherein the generator controller means further includes means for defining the magnitude of the rotor flux field as a function of a desired direct axis current in field coordinates aligned with the direction of the rotor flux field and means for defining the direction of the rotor flux field as a function of the slip speed and rotor speed.

16. The wind turbine as recited in claim 15 wherein the means for defining the direction of the rotor flux vector includes means for defining the slip speed as a function of the quadrature axis current and the magnitude of the rotor flux, and includes means for adding the slip speed to the rotor speed and integrating the sum to obtain a rotor flux angle.

17. A variable speed wind turbine that generates electrical power that varies dependent upon a fluctuating wind speed, said wind turbine providing substantially constant electrical power to a grid supplying multiphase electrical power to consumers, said grid having backup generators for supplying consumer needs not met by wind turbine power, said wind turbine comprising:

a turbine rotor including at least one blade mounted to a rotatable shaft;

a multiphase generator having a stator and a rotor coupled to said rotatable shaft for rotation therewith, said generator providing electrical power with a varying frequency;

a power converter for converting said varying frequency electrical power into constant frequency electrical power, said power converter including a DC voltage link; and an electrical energy source coupled to the DC voltage link, said electrical energy source capable of supplying sufficient energy to smooth output power fluctuations so that the backup generators are not substantially slowed by the increased loads during wind speed fluctuations.

18. The variable speed wind turbine of claim 17 wherein the electrical energy source includes a fuel cell.

19. The variable speed wind turbine of claim 17 wherein the electrical energy source includes a means for storing energy generated in the multiphase generator.

20. The variable speed wind turbine of claim 17 wherein the electrical energy source includes a battery having energy storage within the range of 200 Kw-min to 4000 Kw-min.

21. The variable speed wind turbine of claim 19 wherein the electrical energy source includes a superconducting magnet.

22. The variable speed wind turbine of claim 17, wherein the power converter further comprises:
a rectifier including a pair of active switches for each phase of the generator coupled between the DC voltage link and a stator power tap and operable for switching stator currents therebetween; and
an inverter including a pair of active switches for each phase of output power coupled between the DC voltage link and an output tap and operable for switching inverter currents therebetween.

23. The variable speed wind turbine of claim 22 further comprising a generator controller means coupled to the rectifier for controlling the rectifier switches to regulate stator electrical quantities, wherein the generator controller means includes field orientation means for defining the magnitude of the rotor flux field as a function of a desired direct axis current in rotating field coordinates aligned with the direction of the rotor flux field and for converting the torque reference and rotor speed signals into a desired quadrature axis current in field coordinates oriented normal to a rotor flux vector, and further includes modulation means for controlling the rectifier switches to produce stator electrical quantities that correspond to the desired quadrature and direct axis currents; and
inverter controller means coupled to the inverter for controlling the inverter switches to regulate the inverter currents.

24. A variable speed wind turbine that generates electrical power that varies dependent upon a fluctuating wind speed, comprising:
a turbine rotor including at least one blade mounted to a rotatable shaft;
a multiphase induction generator having a stator and a rotor coupled to said rotatable shaft for rotation therewith;
a power converter coupled to the generator, including,
a DC voltage link,
a rectifier for converting the electrical power generated by the generator into a constant voltage supplied to the DC voltage link,
a bridge inverter for converting the constant voltage on the DC link into a constant frequency AC output, said bridge inverter having active switches operable for controlling output currents;
an electrical energy source coupled to the DC voltage link, said electrical energy source capable of supplying sufficient energy to substantially reduce output power fluctuations during wind speed fluctuations;
means for sensing output currents from the bridge inverter; and
inverter controller means coupled to the bridge inverter for controlling the output currents, including means for establishing desired output currents, means for periodically determining a distortion index indicative of errors between desired and actual output currents, and means for controlling the active switches to produce output currents that minimize the distortion index.

25. The variable speed wind turbine of claim 24 wherein the electrical energy source includes a fuel cell.

26. The variable speed wind turbine of claim 24 wherein the electrical energy source includes a means for storing energy generated in the multiphase induction generator.

27. The variable speed wind turbine of claim 26 further comprising means for controlling the charge/discharge ratio of the electrical energy source.

28. The variable speed wind turbine of claim 24 wherein the electrical energy source includes a battery having energy storage within the range of 200 Kw-min to 4000 Kw-min.

29. The variable speed wind turbine of claim 26 wherein the electrical energy source includes a superconducting magnet.

30. A variable speed wind turbine that generates electrical power that varies dependent upon a fluctuating wind speed, comprising:
a turbine rotor including at least one blade mounted to a rotatable shaft;
a multiphase induction generator having a rotor coupled to said rotatable shaft for rotation therewith, said generator providing electrical power with a varying frequency;
a power converter for converting the variable frequency electricity into constant frequency output electricity, the power converter including a DC voltage link and an inverter for supplying output electricity, said inverter having active switches for controlling instantaneous currents flowing therethrough;
means for supplying a reactive power control signal indicative of the reactive power to be supplied by the inverter; and
inverter controller means coupled to the inverter and responsive to said reactive power control signal for controlling the current flowing through the active switches to supply reactive power in a static mode when the wind turbine is not generating real power.

31. The wind turbine of claim 30 wherein the inverter controller means further includes means for controlling the reactive power in an operational mode when the wind turbine is generating real power.

32. The wind turbine of claim 30 wherein the reactive power signal is indicative of a predetermined number of VARs independent of the real power, and the inverter controller means includes means for producing a current control waveform that produces said predetermined number of VARs.

33. The wind turbine of claim 30 wherein the reactive power control signal is indicative of a predetermined power factor angle, and the inverter controller means includes means for producing a current control waveform that produces said predetermined power angle.

34. The wind turbine of claim 30 further comprising means for selecting between a first and second mode of operation, in the first mode of operation the reactive power control signal is indicative of the predetermined number of VARs independent of the real power, and in the second mode of operation the reactive power signal is indicative of a power factor angle, and the inverter controller means includes means for producing a current control waveform for controlling the active switches, responsive to the reactive power signal, in accordance with the selected mode of operation.

35. The wind turbine of claim 30 further comprising:
drive circuits for driving the active switches of the inverter; and
a delta modulator, responsive to the current control waveform, for controlling the drive circuits.

36. The wind turbine of claim 30 further comprising:
a capacitor coupled across the DC voltage link; and
an inverter control unit including regulation means for regulating the voltage on said capacitor.

37. The wind turbine of claim 36 wherein said regulation means includes:
means for forming a reference waveform from the voltage waveform of the utility grid;
means for applying the reference waveform to form a real waveform;
means for determining a multiplier as a function of the voltage across the energy storage device;
means for multiplying the multiplier by the real waveform to form a multiplied real waveform; and
means for including the multiplied real waveform in the current control waveform.

38. The wind turbine of claim 30 further comprising:
a battery coupled across the DC voltage link; and
an inverter control unit including controller means for controlling the energy storage and discharge of the battery.

39. The wind turbine of claim 38 wherein the controller means includes:
a current sensor positioned to sense the current flow from the generator into the constant voltage link;
means for providing a voltage term indicative of the average voltage of the constant frequency output electricity;
means for multiplying said current flow by said voltage term to provide a power product;
means for providing a battery charge term indicative of the current needed to maintain a predetermined charge/discharge ratio of the battery;
means for adding the power product to the battery charge term to provide a sum signal; and
a low pass filter having the sum signal as an input, and outputting a multiplier signal.

40. The wind turbine of claim 30 further comprising output current sensors operable for sensing output currents, wherein the inverter controller means further includes means responsive to the reactive power control signal for supplying desired output currents.

41. The wind turbine of claim 40 wherein the means for supplying desired output currents includes:
means for creating a sinusoidal reference waveform synchronized with the output electricity;
means responsive to the reactive power control signal for defining a current control waveform; and
means for converting the current control waveform into the desired output currents.

42. The wind turbine of claim 41 wherein the means for creating the sinusoidal reference waveform includes a means for sensing the voltages of the phases of output electricity and for defining the reference waveform from said output voltages.

43. The wind turbine of claim 42 wherein the means for defining a control waveform includes:
means for periodically calculating an imaginary waveform by shifting the reference waveform by 90°;
means for periodically calculating a real waveform from the reference waveform; and
means for adding the imaginary waveform to the real waveform.

44. The wind turbine of claim 43 wherein the imaginary waveform is multiplied by a multiplier selected responsive to the reactive power control signal, to provide a means for controlling the reactive power in the output electricity.

45. The wind turbine of claim 44 further comprising means for regulating the voltage at the input of the inverters.

46. A variable speed wind turbine that generates electrical power that varies dependent upon a fluctuating wind speed, comprising:
a turbine rotor including at least one blade mounted to a rotatable shaft;
a multiphase induction generator having a rotor coupled to said rotable shaft for rotation therewith, said generator providing electrical power with a variable frequency;
a power converter for converting the variable frequency electricity into constant frequency electricity, including a rectifier, an inverter, and a DC voltage link coupled between the rectifier and the inverter, wherein the rectifier includes a pair of active switches for each phase of the generator coupled between the DC voltage link and a stator power tap and operable for switching stator current therebetween, and wherein the inverter includes a pair of active switches for each phase of output power coupled between the DC voltage link and an output tap and operable for switching inverter current therebetween;
electrical energy storage means coupled to the DC voltage link, said electrical energy storage means capable of storing sufficient energy to substantially smooth output power fluctuations;
means for defining a reactive power control signal indicative of a predetermined reactive power; and
an inverter controller coupled to the inverter and responsive to the reactive power control signal for controlling the inverter switches to supply output electricity with the predetermined reactive power, wherein the inverter controller includes
means for creating a sinusoidal reference waveform synchronized with the output electricity,
means for periodically calculating an imaginary waveform by shifting the reference waveform by 90°;
means for periodically calculating a real waveform from the reference waveform,
means for adding the imaginary waveform to the real waveform to produce a current control waveform,
means for controlling the active switches of the inverter to produce output currents that correspond to currents specified by the current control waveform.

47. The wind turbine of claim 46 further comprising:
means for multiplying the imaginary waveform by a multiplier selected responsive to the reactive power control signal prior to adding it to the real waveform; and
means responsive to the voltage of the DC voltage link for multiplying the real waveform, prior to adding it to the imaginary waveform, by a control variable indicative of the inverter input voltage.

48. The wind turbine of claim 46 wherein the reactive power signal is indicative of a predetermined number of VARs independent of the real power, and the inverter controller means includes means for producing a current control waveform that produces said predetermined number of VARs.

49. The wind turbine of claim 46 wherein the reactive power control signal is indicative of a predetermined power factor angle, and the inverter controller means includes means for producing a current control waveform that produces said predetermined power angle.

50. The wind turbine of claim 46 further comprising means for selecting between a first and second mode of operation, wherein in the first mode of operation the reactive power control signal is indicative of the predetermined number of VARs independent of the real power, and wherein in the second mode of operation the reactive power signal is indicative of a power factor angle, and further, wherein the inverter controller means includes means for producing a current control waveform, responsive to the reactive power signal, for controlling the active switches in accordance with the selected mode of operation.

51. A method for converting electricity generated by a variable speed wind turbine into fixed frequency output electricity having a selected reactive power, wherein the wind turbine includes a generator and a means for supply generated electricity to a power converter that includes an inverter supplying the output electricity, the method comprising the steps of:

(a) providing a reactive power control signal indicative of the reactive power to be supplied by the inverter; and (b) controlling a current flow through the inverter to provide the reactive power specified by the reactive power control signal.

52. The method of claim 51 wherein the step (a) includes providing a reactive power control signal indicative of a power factor angle of output electricity and the step (b) includes controlling the inverter to approximately produce said power factor angle of output electricity.

53. The method of claim 51 further comprising:

a step (c) of selecting a VAR number mode or a power factor mode;

if said VAR number mode is selected, then the step (a) includes providing a reactive power signal indicative of a constant number of VARs to be supplied as output electricity, and the step (b) includes controlling the inverter to approximately produce said constant number of VARs; and if the power factor mode is selected, then the step (a) includes providing a reactive power control signal indicative of a power factor angle of output electricity and the step (b) includes controlling the inverter to approximately produce said power factor angle of output electricity.

54. The method of claim 51 wherein the step (a) includes providing a reactive power signal indicative of a constant number of VARs to be supplied as output electricity, and the step (b) includes controlling the inverter to approximately produce said constant number of VARs.

55. The method of claim 54 comprising a further step (c) of: monitoring the reactive power output and adjusting the reactive power control signal to provide a predetermined number of VARs.

56. A method for converting electricity generated by a variable speed wind turbine into fixed frequency output electricity having a selected reactive power, wherein the wind turbine includes a generator and means for supplying generated electricity to a power converter that includes an inverter supplying the output electricity, the method comprising the steps of:

forming a reference waveform defined by the voltage of the output electricity;

rotating the reference waveform by 90° to yield an imaginary waveform;

deriving a real waveform from the reference waveform;

adding the real waveform to the imaginary waveform to yield a current control waveform; and controlling the inverter to produce an output current corresponding to the currents specified by the current control waveform.

57. The method of claim 56 further comprising the step of multiplying the imaginary waveform by a VAR multiplier indicative of the desired number of VARs at the output.

58. The method for converting electricity of claim 56 further comprising the step of regulating the voltage at the input of the inverters by multiplying the real waveform before conversion into the desired output currents by a control variable indicative of the inverter input voltage.

59. The method for converting electricity of claim 56 further comprising the steps of sensing output currents and minimizing a distortion index indicative of the magnitude of current errors between the sensed and desired output currents.

* * * * *